United States Patent
Nagai et al.

(10) Patent No.: US 9,396,137 B2
(45) Date of Patent: *Jul. 19, 2016

(54) STORAGE DEVICE, PROTECTION METHOD, AND ELECTRONIC APPARATUS

(71) Applicant: KABUSHIKI KAISHA TOSHIBA, Minato-ku (JP)

(72) Inventors: Koichi Nagai, Kanagawa (JP); Mitsunori Tadokoro, Kanagawa (JP); Teruji Yamakawa, Tokyo (JP); Kazuo Nakashima, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 116 days.

This patent is subject to a terminal disclaimer.

(21) Appl. No.: 14/737,198

(22) Filed: Jun. 11, 2015

(65) Prior Publication Data

US 2015/0309946 A1 Oct. 29, 2015

Related U.S. Application Data

(63) Continuation of application No. 13/242,651, filed on Sep. 23, 2011, now Pat. No. 9,081,943.

(30) Foreign Application Priority Data

Apr. 8, 2011 (JP) .................................. 2011-086756

(51) Int. Cl.
| | |
|---|---|
| *G06F 3/06* | (2006.01) |
| *G06F 12/14* | (2006.01) |
| *G06F 21/31* | (2013.01) |
| *G06F 21/81* | (2013.01) |

(52) U.S. Cl.
CPC .......... *G06F 12/1408* (2013.01); *G06F 3/0619* (2013.01); *G06F 3/0622* (2013.01);
(Continued)

(58) Field of Classification Search
CPC . G06F 3/0622; G06F 3/0673; G06F 12/1416; G06F 21/31; G06F 21/62; G06F 2221/2137; G06F 2221/2151
See application file for complete search history.

(56) References Cited

U.S. PATENT DOCUMENTS

| | | | |
|---|---|---|---|
| 6,907,497 B2 | 6/2005 | Hosono et al. | |
| 7,418,602 B2 | 8/2008 | Yoshida et al. | |

(Continued)

FOREIGN PATENT DOCUMENTS

| | | |
|---|---|---|
| JP | 8-306196 | 11/1996 |
| JP | 3850791 | 9/2006 |
| JP | 4357963 | 8/2009 |

OTHER PUBLICATIONS

"Toshiba Launches Wipe Technology in Self-Encrypting 2.5-Type Hard Disk Drives", Apr. 13, 2011, http://www.toshiba.co.jp/about/press/2011_04/pr1301.htm, 3 Pages.

(Continued)

*Primary Examiner* — Edward Dudek, Jr.
(74) *Attorney, Agent, or Firm* — Oblon, McClelland, Maier & Neustadt, L.L.P

(57) ABSTRACT

According to one embodiment, a storage device includes, when power is supplied to a storage unit, counting of an elapsed time is started. If a command is input from a host device, and the elapsed time from input of a previous command to input of a current command is calculated based on time information clocked by the host device and on a counter value counted until the corresponding command is input. Matching of the time information is determined based on a temporal relation between the adding result of adding the calculated elapsed time to the time information included in the previous command and the time information included in the current command. When the mismatching is determined, data in the storage unit is invalidated.

21 Claims, 14 Drawing Sheets

(52) U.S. Cl.
CPC ............ *G06F3/0659* (2013.01); *G06F 3/0673* (2013.01); *G06F 3/0679* (2013.01); *G06F 12/1416* (2013.01); *G06F 21/31* (2013.01); *G06F 21/81* (2013.01); *G06F 2206/1014* (2013.01); *G06F 2212/1052* (2013.01); *G06F 2221/2137* (2013.01); *G06F 2221/2141* (2013.01); *G06F 2221/2151* (2013.01)

(56) References Cited

U.S. PATENT DOCUMENTS

| | | | |
|---|---|---|---|
| 9,081,943 | B2 * | 7/2015 | Nagai et al. |
| 2003/0084295 | A1 | 5/2003 | Xie et al. |
| 2003/0097596 | A1 | 5/2003 | Muratov et al. |
| 2004/0230819 | A1 | 11/2004 | Takahashi |
| 2006/0020744 | A1 | 1/2006 | Sinclair et al. |
| 2006/0136732 | A1 | 6/2006 | Vandermolen |
| 2009/0228642 | A1 | 9/2009 | Yano et al. |
| 2009/0249014 | A1 | 10/2009 | Obereiner et al. |
| 2010/0241870 | A1 | 9/2010 | Ito et al. |

OTHER PUBLICATIONS

Japanese Office Action issued May 13, 2014, in Japan Patent Application No. 2011-086756 (with English translation).

* cited by examiner

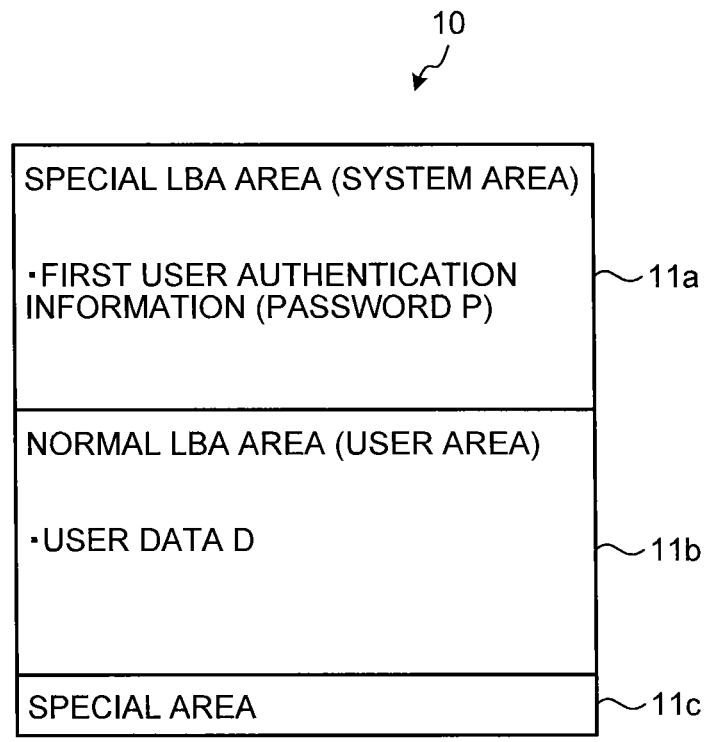

STORAGE DEVICE, PROTECTION METHOD, AND ELECTRONIC APPARATUS

CROSS-REFERENCE TO RELATED APPLICATIONS

This application is a continuation of U.S. application Ser. No. 13/242,651 filed Sep. 23, 2011, and is based upon and claims the benefit of priority from Japanese Patent Application No. 2011-086756, filed on Apr. 8, 2011; the entire contents of each of which are incorporated herein by reference.

FIELD

The present embodiment generally relates to a storage device, a protection method and an electronic apparatus.

BACKGROUND

In the related art, as a storage device for preventing recorded information from being leaked, a storage device for automatically encrypting recorded data is known. The function of such a storage device is known as a Self Encryption Disk (SED) function. In the storage device including this SED function, an encryption key is generated by a set password and the encrypted data may be decrypted by inputting the password from a host device to the storage device.

In order to protect a storage device connected to a host device from a hot plug attack, a technology of synchronizing timers of both the host device and the storage device and generating common data for authentication of both devices using a timer value for synchronization is known.

However, in the technology of preventing information from being leaked by the SED function, there is a possibility that a password is read from an information flow between the host device and the storage device, there is room for improvement. In the technology of synchronizing the timers of the host device and the storage device, a connection relation between both devices may be verified, but a process or mechanism for synchronizing the timers is necessary in both devices. Thus, a technology of more conveniently improving security of a storage device including a correct connection relation is required.

In the case where encryption is performed without influencing a recording speed, a reading speed, etc. of a storage device in order to prevent information from being leaked, an encryption processing circuit needs to be assembled in the storage device and the storage device becomes complicated. In the device in which the encryption device is assembled, there is regulation in distribution, etc. in many countries, a distribution procedure is cumbersome, and a sale destination is restricted.

BRIEF DESCRIPTION OF THE DRAWINGS

FIG. 4 is a schematic diagram illustrating data in NAND memory according to the first embodiment;

FIG. 5 is a diagram illustrating a configuration example of address conversion information;

DETAILED DESCRIPTION

According to embodiments, a storage device is provided. In the storage device, a storage unit stores data in a storage area including non-volatile semiconductor memory and an elapsed-time measurement unit starts count of an elapsed time when power is supplied to the storage unit. A reception unit receives an input of a command including time information representing a current date and time clocked by a host device and a password from the host device connected to the storage unit. A calculation unit calculates an elapsed time from a previous command input to a current command input based on the time information included in the currently input command and a counter value counted by the elapsed-time measurement unit until the command is input. An adding unit adds the elapsed time calculated by the calculation unit to the time information included in the previously input command. A time information determination unit determines matching of the time information based on a temporal relation between the adding result of the adding unit and the time information included in the currently input command. An invalidation unit invalidates the data stored in the storage area when mismatching is determined by the time information determination unit. An authentication unit performs authentication of the password included in the currently input command when matching is determined by the time information determination unit and permits access to the storage area when authentication succeeds.

Hereinafter, a storage device, a protection method and an electronic apparatus according to embodiments will be described with reference to the accompanying drawings. The present invention is not limited to such embodiments.

(First Embodiment)

In the present embodiment, in the case where password authentication fails or in the case where authentication commands are continuously input in a short period of time, user data in non-volatile semiconductor memory may not be read (invalidation process). Validity of a host device which is an access source is checked to prevent the unauthorized reading (hot plug attack) of the user data.

Figure 1:
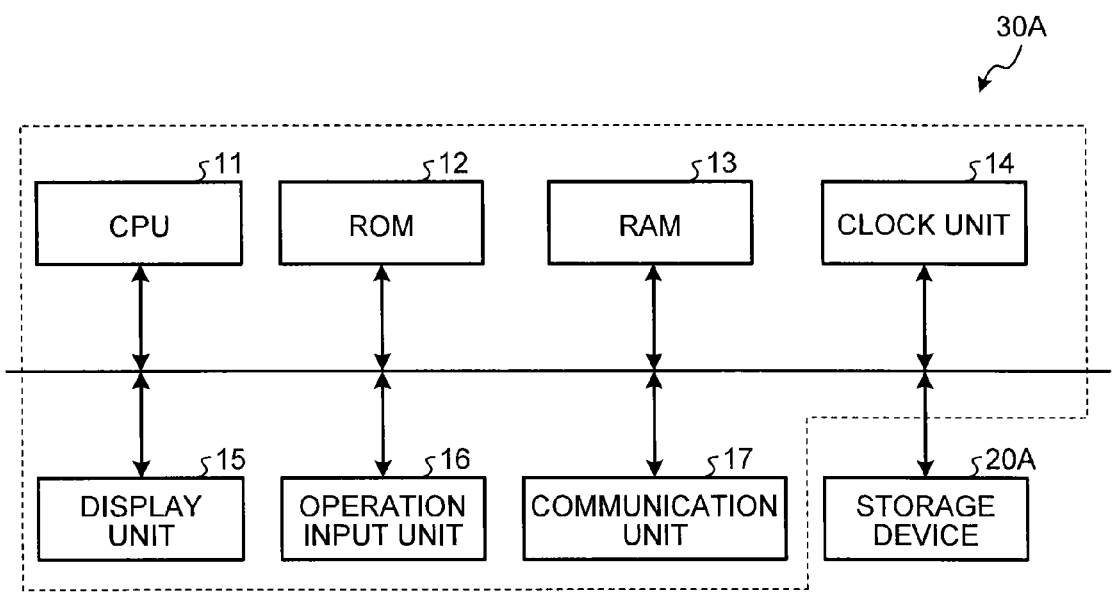
FIG. 1 is a schematic diagram illustrating the configuration of an electronic apparatus according to a first embodiment.

FIG. 1 is a schematic diagram illustrating the configuration of an electronic apparatus according to a first embodiment. As illustrated in FIG. 1, the electronic apparatus (data storage system) is an apparatus such as a personal computer (PC) having a host device 30A and a storage device 20A. The host device 30A includes a central processing unit (CPU) 11, read only memory (ROM) 12, random access memory (RAM) 13, a clock unit 14, a display unit 15, an operation input unit 16, and a communication unit 17.

The CPU 11 sets a predetermined area of the RAM 13 as a working area, executes a variety of programs previously stored in the ROM 12 or the storage device 20A, and totally controls operation of the units configuring the host device 30A.

The ROM 12 is a non-volatile storage device and stores such as programs associated with the control of the host device 30A and a variety of setting information in an unrewritable way. The RAM 13 is a volatile storage device, functions as a working area of the CPU 11, and functions as a stack, a buffer, etc. in various processes.

The clock unit 14 is a clock device such as a real time clock (RTC) mounted in the host device 30A and generates time information representing the current date and time. In addition, the time information is represented by seconds from a predetermined year/month/day (for example, Jan. 1, 1900). For example, if the current date and time is 13:14:15, Nov. 12, 2010, the time information is represented by "D08A5F27" (hexadecimal notation).

The display unit 15 includes a display device such as a liquid crystal display (LCD) and displays a variety of information based on a display signal from the CPU 11. The operation input unit 16 includes various input keys, receives information input by a user as an instruction signal, and outputs the instruction signal to the CPU 11. In addition, the display unit 15 may configure a touch panel integrally with the operation input unit 16.

The communication unit 17 is a communication interface which performs communication with an external device through a network (not illustrated), outputs a variety of information received from the external device to the CPU 11, and transmits a variety of information output from the CPU 11 to the external device.

The storage device 20A of the present embodiment rewritably stores programs associated with the control of the host device 30A, a variety of data, and etc. The storage device 20A is, for example, a storage device using non-volatile semiconductor memory as a recording medium, such as a solid state drive (SSD) or flash memory.

The storage device 20A determines whether or not access of the host device such as the host device 30A or 30B is authorized based on a predetermined password and time information and allows data to be written in or read from a recording medium only when it is determined that the access is authorized. Then, upon access to the storage device 20A, the CPU 11 transmits an authentication command including time information acquired from the clock unit 14 to the storage device 20A along with a command instructing read/write, etc. In addition, the operation of the CPU 11 associated with access to the storage device 20A is realized by cooperation with the programs stored in the ROM 12 or the variety of setting information.

Figure 2:
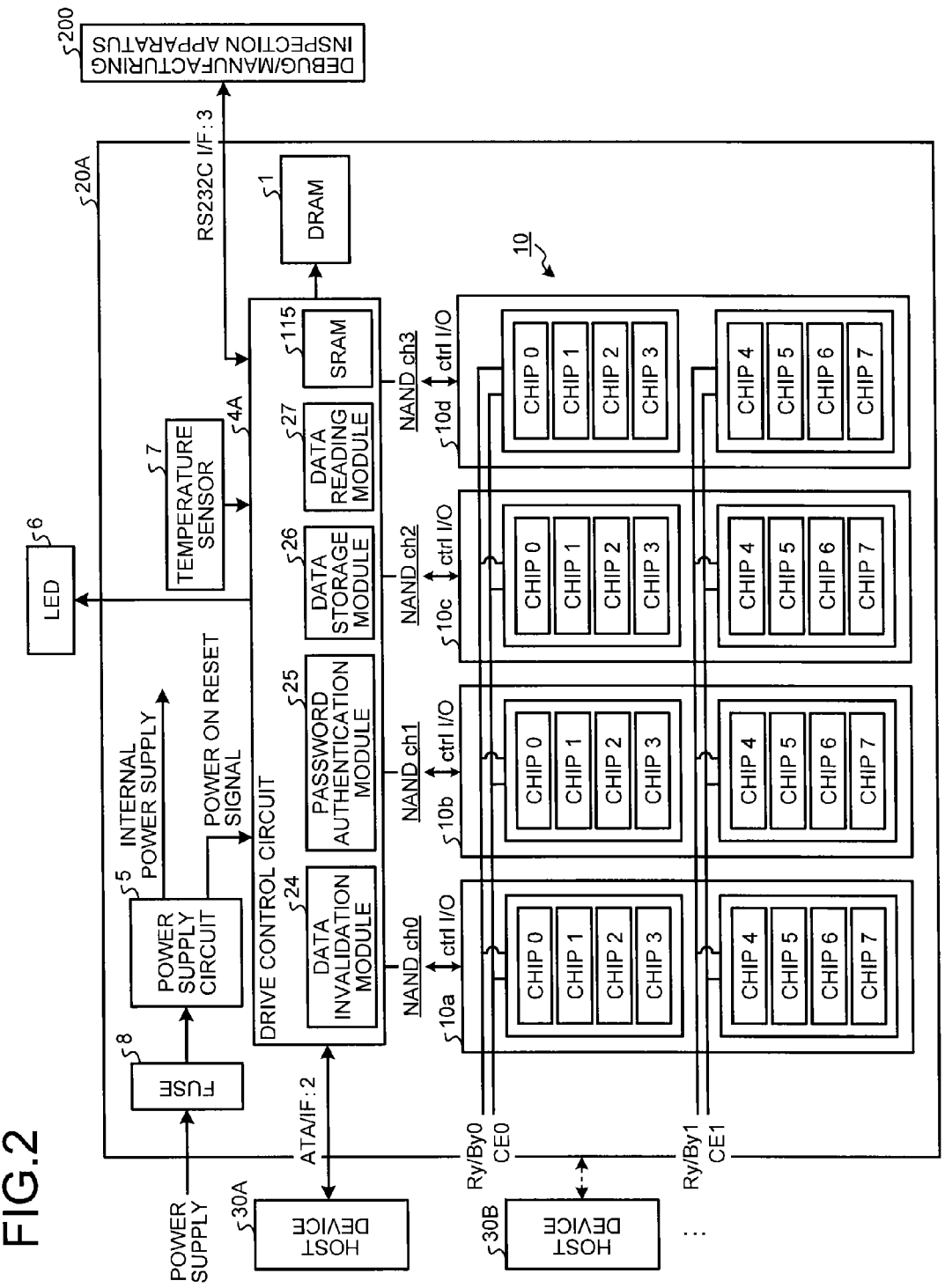
FIG. 2 is a block diagram illustrating an example of the configuration of a storage device according to the first embodiment.

FIG. 2 is a block diagram illustrating an example of the configuration of the storage device according to the first embodiment. The data storage system includes the storage device 20A which may be attachably and detachably connected to the arbitrary host devices 30A, 30B, . . . and a regular host device 30A having access rights to the storage device 20A among the arbitrary host devices 30A, 30B, . . . .

The storage device 20A is connected to the host device 30A such as a personal computer or a CPU core through a memory access interface such as an ATA interface (ATA I/F) 2 and functions as external memory of the host device 30A. The storage device 20A may transmit and receive data to and from a debug/manufacturing inspection apparatus 200 through a communication interface 3 such as an RS232C interface (RS232C I/F). The storage device 20A includes NAND type flash memory (hereinafter, referred to as NAND memory) 10 as non-volatile semiconductor memory, a drive control circuit 4A as a controller, DRAM 1 as volatile semiconductor memory, a power supply circuit 5, a status display LED 6, a temperature sensor 7 for detecting the internal temperature of the drive, and a fuse 8. The drive control circuit 4A includes a data invalidation module 24, a password authentication module 25, a data storage module 26, a data reading module 27, and static random access memory (SRAM) 115.

In the present embodiment, the NAND memory 10 is used for the non-volatile semiconductor memory. The NAND memory 10 includes, for example, four parallel operation elements 10a to 10d for performing four parallel operations and one parallel operation element includes two NAND memory packages. Each NAND memory package includes a plurality of stacked NAND memory chips (for example, 1 chip=2 GB). In FIG. 2, each NAND memory package includes four stacked NAND memory chips and the NAND memory 10 has capacity of 64 GB. If each NAND memory package includes eight stacked NAND memory chips, the NAND memory 10 has capacity of 128 GB.

The DRAM 1 functions as a cache for data transmission and memory for a working area between the host device 30A and the NAND memory 10. Instead of the DRAM 1, FeRAM (Ferroelectric Random Access Memory) or MRAM (Magnetoresistive Random Access Memory) may be used. The drive control circuit 4A performs data transmission control through the DRAM 1 between the host device 30A and the NAND memory 10 and controls the components in the storage device 20A. The drive control circuit 4A supplies a status display signal to the status display LED 6, receives a power on reset signal from the power supply circuit, and supplies a reset signal and a clock signal to its own circuit and the units of the storage device 20A. In addition, the LED 6 may not be present in the storage device 20 and only a terminal for outputting a signal for turning the LED 6 provided in the host device on may be provided, for example.

Figure 3A:
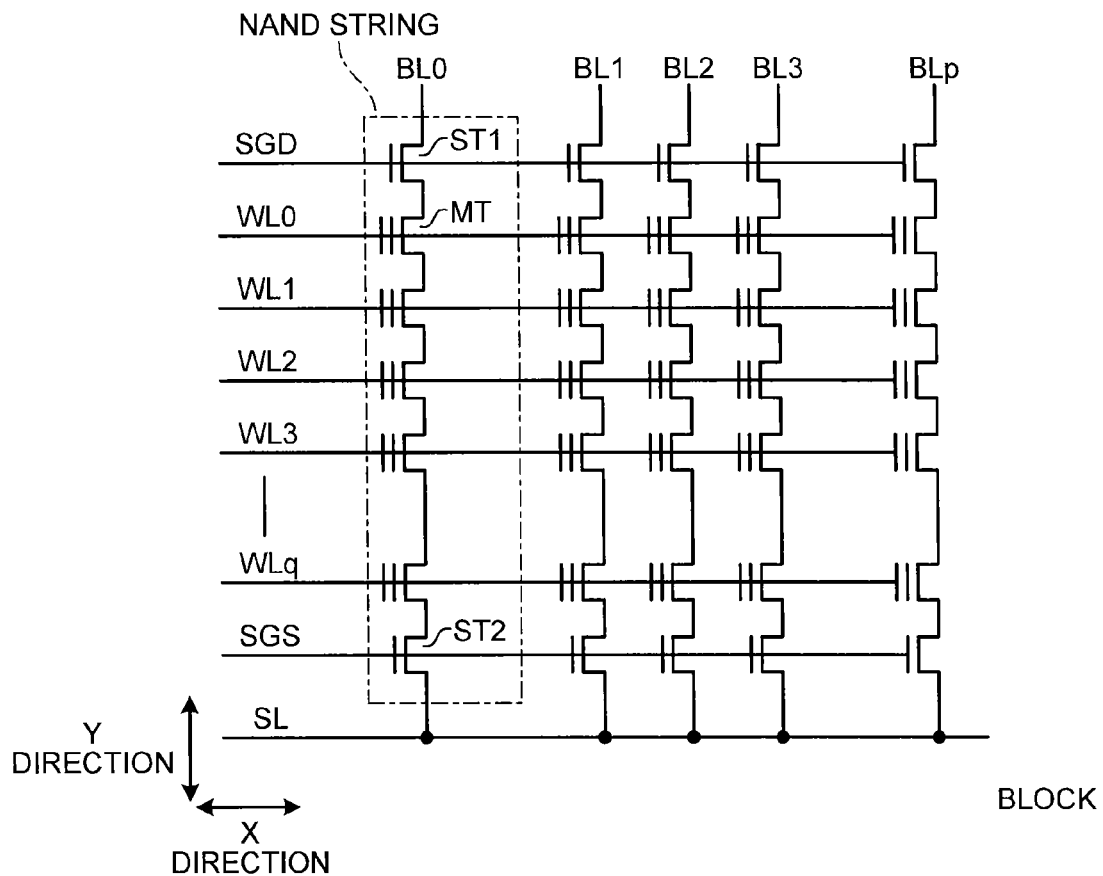
FIG. 3A is a diagram illustrating a configuration example of one block included in a NAND memory chip.

Each NAND memory chip includes a plurality of physical blocks and each block size is a data erasing unit. FIG. 3A is a circuit diagram illustrating a configuration example of one physical block included in a NAND memory chip. Each physical block includes (p+1) NAND strings (p is an integer equal to and greater than 0) sequentially arranged in an X direction. Drains of selection transistors ST1 respectively included in the (p+1) NAND strings are connected to bit lines BL0 to BLp and gates of the selection transistors ST1 are commonly connected to a selection gate line SGD. Sources of selection transistors ST2 are commonly connected to a source line SL and gates of the selection transistors ST2 are commonly connected to a selection gate line SGS.

Each memory cell transistor MT includes a metal oxide semiconductor field effect transistor (MOSFET) including a laminated gate structure formed on a semiconductor substrate. The laminated gate structure includes a charge accumulation layer (floating gate electrode) formed on the semiconductor substrate with a gate insulating film interposed therebetween and a control gate electrode formed on the charge accumulation layer with an inter-gate insulating film interposed therebetween. In the memory cell transistor MT, a threshold voltage is changed according to the number of electrons accumulated in the floating gate electrode and data is stored according to a variation in the threshold voltage. The memory cell transistor MT may be configured to store 1 bit or multiple values (data of 2 bits or more).

The memory cell transistor MT is not limited to the structure including the floating gate electrode and may have a structure which may adjust a threshold by trapping electrons in a nitride film interface as a charge accumulation layer, such as a metal-oxide-nitride-oxide-silicon (MONOS) type. The memory cell transistor MT of the MONOS structure may be configured to store 1 bit or multiple values (data of 2 bits or more).

In each NAND string, the (q+1) memory cell transistors MT may be arranged between the sources of the selection transistors ST1 and the drains of the selection transistors ST2 such that respective current paths are connected in series. That is, the plurality of memory cell transistors MT are connected in series in a Y direction such that adjacent memory cell transistors share a diffusion area (a source area or a drain area).

Control gate electrodes are sequentially connected to word lines WL0 to WLq from a memory cell transistor MT closest to the drain side. Accordingly, the drain of the memory cell transistor MT connected to the word line WL0 is connected to the source of the selection transistor ST1 and the source of the memory cell transistor MT connected to the word line WLq is connected to the drain of the selection transistor ST2.

The word lines WL0 to WLq are commonly connected to the control gate electrodes of the memory cell transistors MT between the NAND strings in the physical block. In other words, the control gate electrodes of the memory cell transistors MT located at the same row in the block are connected to the same word line WL. The (p+1) memory cell transistors MT connected to the same word line WL are treated as one page (physical page) and data write and data read are performed in every physical page.

The bit lines BL0 to BLp are commonly connected to the drains of the selection transistors ST1 between the blocks. In other words, the NAND strings located at the same column in the plurality of blocks are connected to the same bit line BL.

Figure 3B:
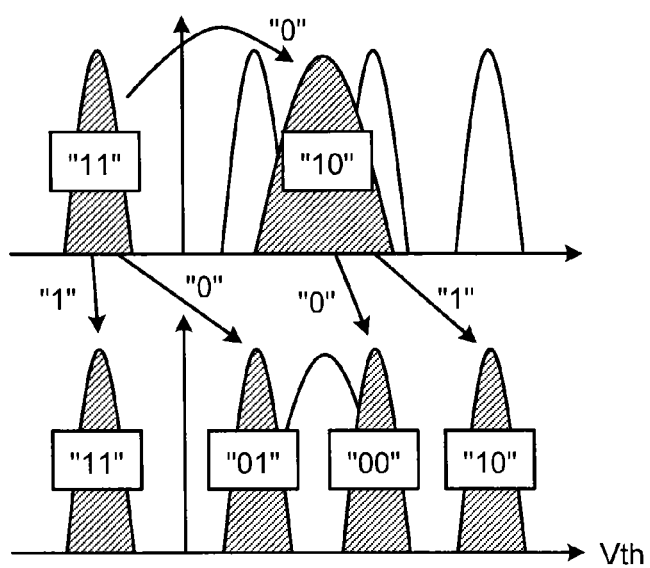
FIG. 3B is a diagram illustrating a threshold value distribution in a quaternary data storage system.

FIG. 3B is, for example, a schematic diagram illustrating a threshold distribution in a quaternary data storage system for storing 2 bits in one memory cell transistor MT. In the quaternary data storage system, any one of quaternary data "xy" defined as high order page data "x" and low order page data "y" may be stored in the memory cell transistor MT.

In the quaternary data "xy", for example, data "11", "01", "00", and "10" may be allocated in order of threshold voltages of the memory cell transistors MT. The data "11" is an erasing state in which the threshold voltage of the memory cell transistor MT is negative.

In a low order page write operation (an upper end side of FIG. 3B), data "10" is written by selectively writing low order bit data "y" in the memory cell transistor MT of the data "11" (erasing state). The threshold distribution of the data "10" before high order page write is located at about a middle of the data "01" and the data "00" after high order page write and may be wider than the threshold distribution after high order page write.

In the high order page write operation (a lower end side of FIG. 3B), the data "01" and the data "00" are written by selectively writing the high order bit data "x" in the memory cell of the data "11" and the memory cell of the data "10".

FIG. 4 is a schematic diagram illustrating data in NAND memory according to the first embodiment. In FIG. 4, division of storage areas of the NAND memory 10 viewed from the host device 30A is illustrated. The NAND memory 10 which is non-volatile semiconductor memory is, as illustrated in FIG. 4, divided into a special logical block addressing (LBA) area (system area) 11a which may not be accessed by a general user, a special area 11c to which LBA may not be allocated, and a normal LBA area (user area) 11b which may be accessed by the general user.

While the user area 11b is the LBA area (logical address area) which may be accessed by a command (a read command/write command, etc.) from the host device 30A, the system area 11a and the special area 11c which are non-user areas may not be accessed by a normal command output from the host device 30A. In the NAND memory 11, an area to which the LBA does not correspond is the special area 11c. In the present embodiment, the non-user area includes the special LBA area (system area) 11a used to record management information and also the special area 11C including an area in which firmware is recorded and to which the LBA including a free block FB is not allocated.

In addition, the system area 11a and the special area 11C may be accessed by a command output from a module configuring firmware (FW) stored in the storage device 20A (SSD). The firmware (FW) stored in the special area 11c is read upon start-up by the below-described booting program and is loaded and executed in the SRAM 115, for example.

In addition, the system area 11a, the user area 11b, and the special area 11c do not need to be present as physically contiguous physical areas and an individual physical management unit of the NAND memory 11 belongs to such areas. The area to which the individual physical management unit belongs is not fixed and is changed according to use of the storage device 20. For example, if a block which has been used as the special area 11c is released to become the free block FB and user data is then recorded in this free block FB, the block is thereafter used as the normal LBA area 11b. The area to which the individual physical management unit belongs is not fixed and is changed according to use of the storage device 10.

The system area 11a, the user area 11b and the special area 11c will be described using an example. Now, if the size of the storage area of the storage device 20A is, for example, 64 GB, the area of 64 GB is the user area. The term "area of 64 GB" described herein means that the range of the LBA is 64 GB and does not always mean that the NAND memory 11 of 64 GB may be physically allocated. Meanwhile, in the storage device 20A, in addition to the area (user area) of 64 GB which may be accessed from the host device 30A, the area (non-user area) of a predetermined size (for example, about 1 logical block) as an area for storing the internal information of the storage device 20A is mapped onto the LBA. The area of 64 GB is the user area 11b, the area of the predetermined size is the system area 11a, and the area which does not belong to the above area is the special area 11c. Although the firmware is recorded in the special area 11c, the firmware may be recorded in the special LBA area.

The system area 11a is, for example, used to store management data for managing the storage device 20A, SMART information, and etc. The management data stored in the system area 11a is handled in the same management manner as the user data stored in the user area 11b and may be allocated to all logical blocks to which the user area 11b may be mapped.

The system area 11a stores, for example, first user authentication information. The first user authentication information is used to authenticate a regular user who uses the regular host device 30A. Although the password P of a regular user is, for example, used as the first user authentication information, the present invention is not limited thereto. For example, a user ID may be used or both the password P and the user ID may be used as the first user authentication information. The first user authentication information is written in the system area 11a from a password authentication module 25 in advance, for example, upon initial setting. Although user authentication may be performed, some authentication information such as device authentication information for authenticating a regular host device may be changed to be written in advance.

The user area 11b stores user data D. The data storage module 26 has a function for storing data on the NAND memory 10 which does not hold valid data. The data storage module 26 receives a logical address and user data D sent from the host device 30A, writes the user data in a block on the NAND memory 10 which does not hold valid data, and writes a correspondence state of the physical address and the logical address transmitted from the host device 30A in address conversion information of system area 11a. The address conversion information is a logical/physical conversion table in which the logical address corresponds to the physical address.

FIG. 5 is a diagram illustrating a configuration example of address conversion information. As illustrated in FIG. 5, the address conversion information represents a correspondence relation between the LBA as the logical address specified by the host device 30A and the physical address which is a data storage location on the NAND memory 10.

The data reading module 27 has a function for reading data of the specified logical address from the NAND memory 10. If the data of the address specified by the host device 30A is required to be output, from the address conversion information held in the system area 11a, address conversion means (not illustrated) in the drive control circuit 4A converts the logical address into the physical address, reads the user data D from the physical address, and outputs the user data to the host device 30A.

Initially, the physical address corresponding to the logical address is not registered in the address conversion information. Thus, when a read request is received, the data reading module 27 performs an operation, such as an operation for outputting data which is not written by the host device 30A or an operation for notifying the host device 30A of error.

As this realizing method, for example, the address conversion information is initially stored in a state in which the physical address for storing the user data D corresponding to the logical address is not present, and the physical address corresponding to the logical address is registered upon storage. If the physical address corresponding to the address conversion information is not present, the address conversion means outputs data including only a zero value or notifies the host device 30A of error.

Alternatively, for example, the initial address conversion information is set to represent that all logical addresses correspond to a physical address of a special block in which one fixed data is stored. If a read request is received from the host device 30A, data obtained by reading the special block may be output to the host device 30A.

The realizing method is not limited to this example, and various methods of realizing the storage device 20A may be used. In the address conversion information, in a state in which the physical address for storing the user data D corresponding to the logical address is not registered, even when the user data D is stored on the NAND memory 10, the user data D may not be output by the request from the host device 30A.

The drive control circuit 4A of the present embodiment controls the data invalidation module 24. The data invalidation module 24 performs an invalidation process of the user data upon authentication failure. The invalidation process of the user data disable the user data D to be read from the host device 30A.

Figure 6:
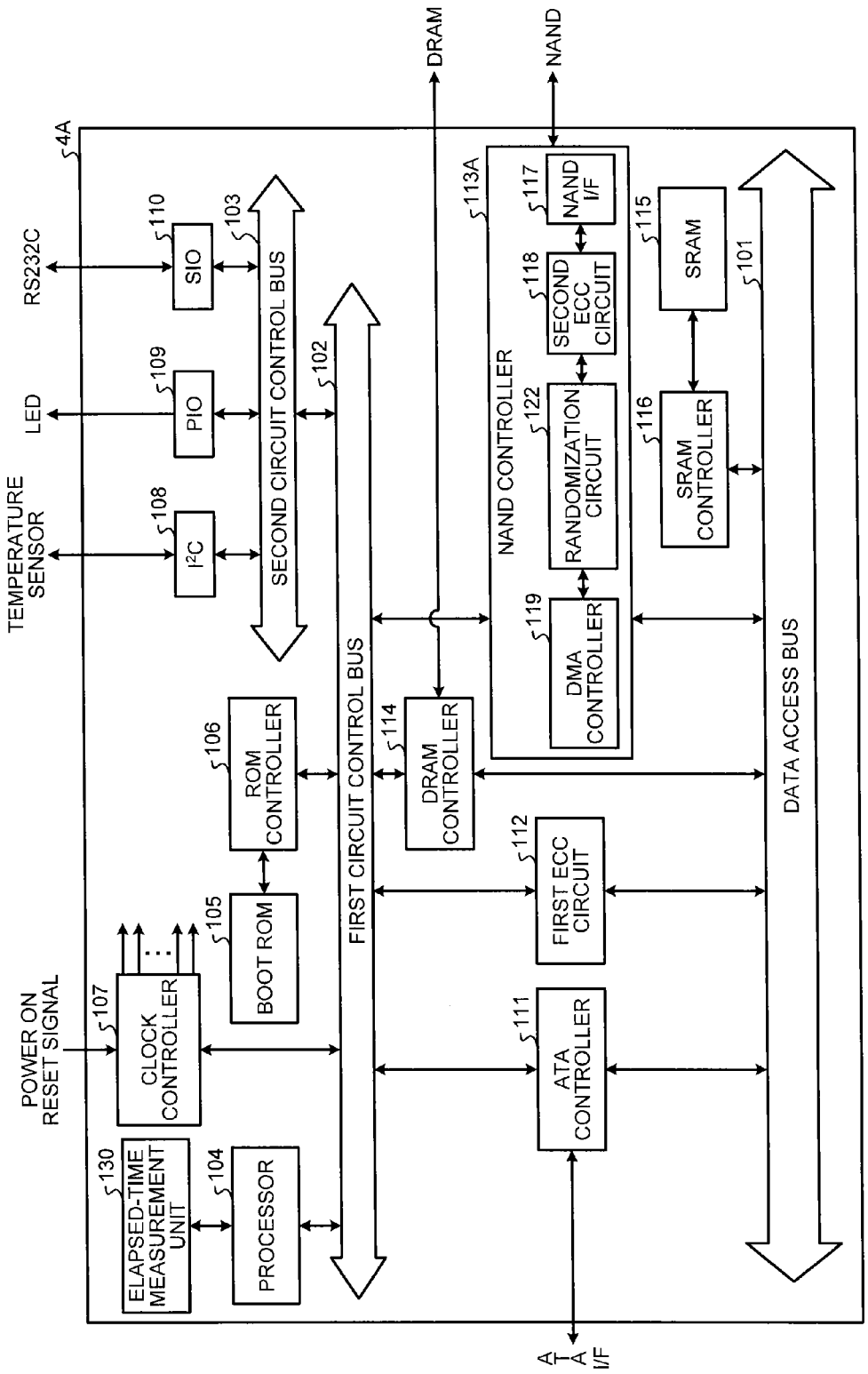
FIG. 6 is a block diagram illustrating a hardware internal configuration example of a drive control circuit according to the first embodiment.

FIG. 6 is a block diagram illustrating a hardware internal configuration example of a drive control circuit according to the first embodiment. The drive control circuit 4A includes a data access bus 101, a first circuit control bus 102, and a second circuit control bus 103. A processor 104 for controlling the overall drive control circuit 4A is connected to the first circuit control bus 102. A boot ROM 105 for storing a boot program for booting each management program (firmware (FW)) stored in the NAND memory 10 is connected to the first circuit control bus 102 through a ROM controller 106. A clock controller 107 for receiving a power on reset signal from the power supply circuit 5 illustrated in FIG. 2 and supplying a reset signal and a clock signal to the units is connected to the first circuit control bus 102.

The second circuit control bus 103 is connected to the first circuit control bus 102. An I$^2$C circuit 108 for receiving data from the temperature sensor 7 illustrated in FIG. 2, a parallel IO (PIO) circuit 109 for supplying a status display signal to the status display LED 6, and a serial IO (SIO) circuit 110 for controlling the RS232C I/F 3 are connected to the second circuit control bus 103.

An ATA interface controller (ATA controller) 111, a first error checking and correction (ECC) circuit 112, a NAND controller 113A and a DRAM controller 114 are connected to both the data access bus 101 and the first circuit control bus 102. The ATA controller 111 transmits and receives data to and from the host device 30A through the ATA interface 2. The SRAM 115 used as a data working area and a firmware load area is connected to the data access bus 101 through an SRAM controller 116. The firmware stored in the NAND memory 10 is transmitted to the SRAM 115 by the boot program stored in the boot ROM 105 upon start-up.

The NAND controller 113A includes a NAND I/F 117 for performing an interface process with the NAND memory 10, a second ECC circuit 118, a randomization circuit 122, and a DMA transmission control DMA controller 119 for performing access control between the NAND memory 10 and the DRAM 20. The second ECC circuit 118 encodes a second correction code and encodes and decodes a first error correction code. The first ECC circuit 112 decodes a second error correction code. The first error correction code and the second error correction code includes, for example, a Hamming code, Bose Chaudhuri Hocqenghem (BCH) code, Reed Solomon (RS) code, a Low Density Parity Check (LDPC) code, and etc. The correction capability of the second error correction code is higher than the correction capability of the first error correction code. The randomization circuit 122 randomizes data stored in the NAND memory 10, but may not be used.

Figure 10:
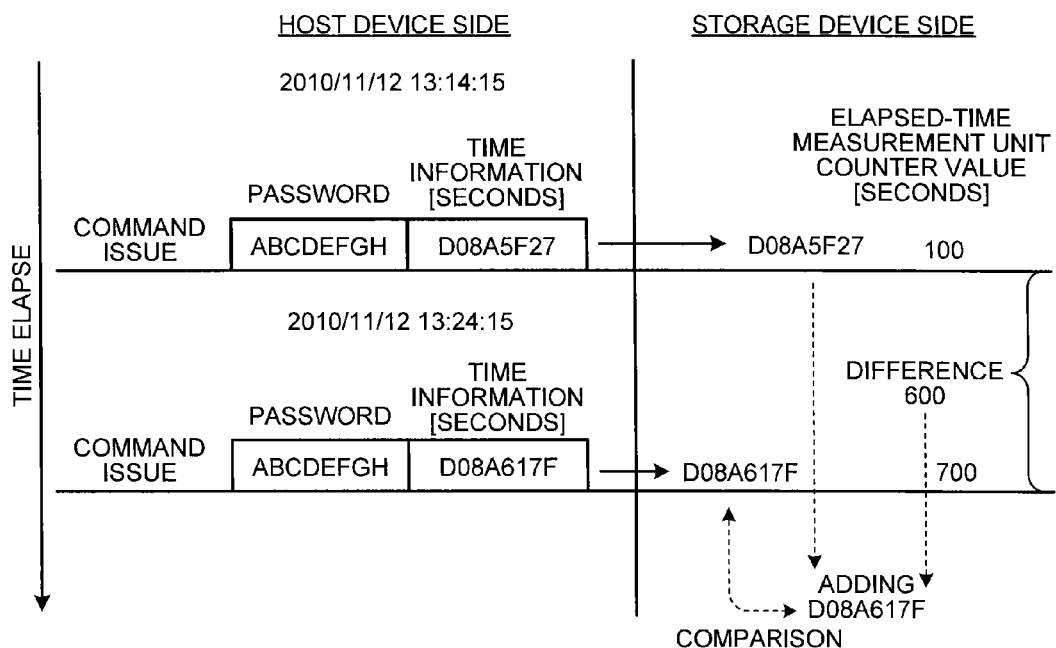
FIG. 10 is a diagram illustrating a time information determination process.

The randomization circuit 122 is provided, for example, between the DMA controller 119 and the second ECC circuit 118. In addition, the randomization circuit 122 may be provided between the second ECC circuit 118 and the NAND I/F 117. FIG. 10 illustrates the case where the randomization circuit 122 is connected to the DMA controller 119 and the second ECC circuit 118 is connected to the randomization circuit 122.

In the characteristics of the NAND memory 10 which is mainly used as non-volatile semiconductor memory, if data is randomized and recorded, the lifespan of the NAND memory is increased. Thus, in the storage device using the NAND memory which has been miniaturized, the data is randomized and recorded. As a randomization system, reversible conversion is used, and there is a method of using a pseudo random number (a random number which may be used for encryption is not necessary) or a method of using an encryption algorithm as a fixed key.

Even when the key is not fixed, if a key length is short, encryption strength weakens, but the lifespan of the NAND memory is sufficiently increased. Data randomization hardware may be realized by simple hardware as compared to the encryption function for protecting data. Since randomization is performed by simpler hardware than hardware for randomization used in an encryption drive, even when the storage device 20A is disassembled and data is directly read from the NAND memory 10, it is difficult to easily obtain original data before randomization.

The drive control circuit 4A of the present embodiment includes an elapsed-time measurement unit 130 for measuring an elapsed time after power begins to be supplied to the storage device 20A. The elapsed-time measurement unit 130 sends the counted elapsed time to the processor 104. The count value measured by the elapsed-time measurement unit 130 is used to determine temporal matching of the time information with the time information transmitted from the host device 30A as an authentication command.

Figure 7:
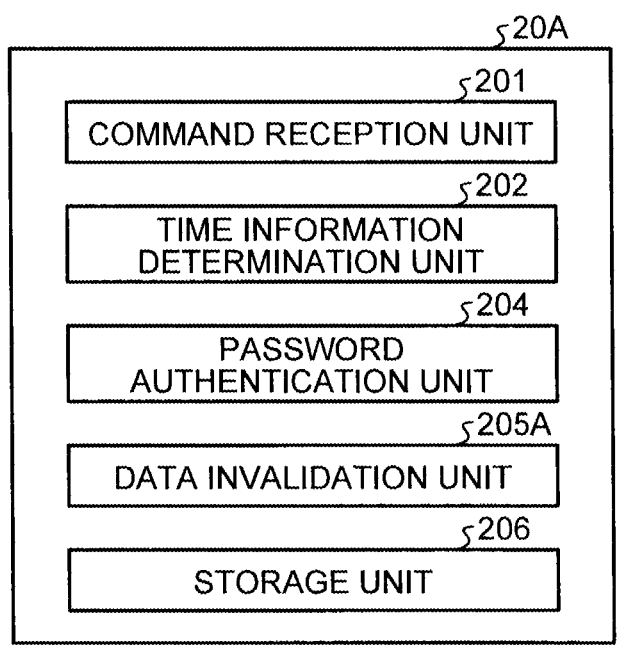
FIG. 7 is a diagram illustrating a functional configuration of the storage device according to the first embodiment.

Next, the configuration of the storage device 20A will be described with reference to FIG. 7. FIG. 7 is a diagram illustrating a functional configuration of the storage device according to the first embodiment. As illustrated in FIG. 7, the storage device 20A includes a command reception unit 201, a time information determination unit 202, a password authentication unit 204, a data invalidation unit 205A, and a storage unit 206.

The command reception unit 201 is a functional unit for performing control associated with the reception of a command (authentication command) input through the host IF (ATA interface 2). More specifically, the command reception unit 201 confirms the states of a start-up invalidation flag and an unauthorized use flag held in the storage unit 206 when the reception of the command is started (when power is supplied to the storage device 20A). If both flags are not set, the command reception unit 201 determines that previous power disconnection of the storage device 20A is authorized and starts the reception of the command from the host device 30A. If any one of the start-up invalidation flag and the unauthorized use flag is set, the command reception unit 201 determines that an unauthorized operation is performed and stops the reception of the command.

Here, the start-up invalidation flag is flag information set when a predetermined operation (for example, password authentication failure, etc.) which is suspected of an unauthorized operation of the storage device 20A is performed. The unauthorized use flag is flag information set when a predetermined operation (for example, password authentication fails predetermined times) which is defined as an unauthorized operation is performed.

The command reception unit 201 stops the reception of the command from the host device 30A for a predetermined time if the unauthorized use flag is set during the operation of the storage device 20A and resumes the reception of the command after the predetermined time. In addition, the stop time of the command reception is set in the storage unit 206 (flash memory, etc.) in advance as setting information.

The time information determination unit 202 executes a time information determination process of determining temporal matching of the time information based on the time information transmitted from the host device 30A as the authentication command and the counter value counted by the elapsed-time measurement unit 130. In addition, details of the time information determination process will be described below (see FIG. 9).

The password authentication unit 204 compares a password included in an authentication command with the below-described checking password stored in the storage unit 206 for checking the password, determines whether both passwords match, and performs authentication of the password.

The password authentication unit 204 detects the number of times of input of the authentication command per a constant time and determines the input of the authentication command is continuously performed in a short period of time when the number of times of input exceeds a predetermined upper limit value. In this case, as described below, since there is a possibility that password attack such as brute force attack is performed, the password authentication unit 204 determines the unauthorized operation. In addition, the upper limit value used when the unauthorized operation is determined is set in the storage unit 206 (flash memory, etc.) as setting information in advance.

The password authentication unit 204 determines that there is a possibility of an unauthorized operation if password mismatching is confirmed (if password authentication fails) and sets the start-up invalidation flag. In addition, the password authentication unit 204 determines the unauthorized operation if password authentication fails predetermined times and sets the unauthorized use flag. In addition, if password authentication succeeds, the set of the start-up invalidation flag and the unauthorized use flag is released (cleared) so as to allow access to the storage device 20A.

The data invalidation unit 205A is a functional unit for performing invalidation of the user data D in the NAND memory 10 according to the result of determining each functional unit. Here, invalidation of the user data is a process of disabling an unauthorized host device such as the host device 30B to read user data. In other words, data recorded in the NAND memory 10 is prevented from being read.

The storage unit 206 is a functional unit realized by at least one part of a storage area of non-volatile memory (NAND memory 10, etc.) included in the storage device 20A and stores a variety of information associated with execution of the below-described command reception process.

More specifically, the storage unit 206 stores a checking password, a password setting date and time, the above-described start-up invalidation flag, the unauthorized user flag, and etc. as information associated with execution of the command reception process.

Here, the checking password is a regular password associated with use of the storage device 20A and is used to check the password transmitted from the host devices 30A, 30B, and etc. The password setting date and time is information indicating the date and time when the checking password is set. In addition, the password setting date and time is represented by seconds from a predetermined year/month/day (for example, Jan. 1, 1900), similarly to the above-described time information.

Now, the detailed invalidation method of the user data D by the data invalidation unit 205A will be described. As the invalidation method of the user data D, for example, there are following five methods.

(First Invalidation Method)

As the first method of invalidating the user data D, there is a method of initializing the above-described address conversion information. Initialization refers to a state in which a physical address in which the user data D corresponding to the logical address is recorded is not present. In this method, since the size of the address conversion information is much smaller than the entire amount of data of the storage device 20A, it is possible to invalidate the user data D in a very short period of time.

Accordingly, when the data on the NAND memory 10 is read from the storage device 20A in which the address conversion information is initialized, for example, if means for specifying and reading the physical address without the logical address is not separately provided, the user data D is not possible to read through an interface. In addition, if the randomization circuit 122 is included, as described above, even when disassembling is performed so as to directly read data from the NAND memory 10, it is difficult to easily obtain original data before randomization.

In addition, in actual implementation, from the viewpoint of management, a plurality of steps of converting a logical address received from an external device into an internal logical address of the apparatus, then converting the address into a logical block address, and finally converting the address into a physical address may be used. An operation for eliminating the address conversion information in the above description is performed at any one step of the process of converting the logical address received from the external device into the final physical address. As an example of mount, the physical address space of the NAND memory 10 is divided into a special area 11c in which information (a control program of the drive control circuit 4A, etc.) necessary to start up the apparatus is recorded and the remaining area for internal logical address space. In addition, the internal logical address space may be divided into an area to which the logical address space received from the external device is mapped (user area 11b) and a special LBA area used by the drive control circuit 4A as a system area 11a. In this case, by abandoning only the conversion information into the physical address from the internal address space mapped for the user data D, it is possible to disable data access from an unauthorized host device without losing the information of the system area 11a necessary for the operation of the storage device 20A.

(Second Invalidation Method)

As a second method of invalidating user data D, there is a method of erasing an area (user area 11b) in which user data is recorded in the NAND memory 10. Since overwriting may not be performed in the NAND memory 10 unlike a hard disk drive using magnetic recording, erasing is performed in block units and recording is then performed. Since recording (writing) is time-consuming, if only erasing is performed, it is possible to realize a high-speed operation. Accordingly, it is possible to erase actually recorded data. For example, while 200 ms is necessary for erasing and recording of one block, erasing may be performed for 5 ms or less. Thus, it is possible to perform erasing for a time which is equal to or less than 1/40 a time necessary for erasing by overwriting of one block.

In addition, in the storage device 20A using the NAND memory 10, in a general recording operation, there are a method of performing erasing when valid data is not held (when a block becomes a free block) such as when a block is excluded from the above-described address conversion information and a method of performing erasing just before recording data without performing erasing when a block becomes a free block.

In erasing of invalidation of the user data D, all blocks having a possibility that the user data D may be recorded may be actually erased regardless of whether or not a block becomes a free block. If the user data D and the internal information of the storage device 20A are mixed and recorded in one NAND block, data other than the user data D is copied to another block and the user data D is then erased. If the information of the corresponding block is erased without initializing the address conversion information, the read data does not match an error correction code. Thus, thereafter, if the data is read, then all data becomes uncorrectable error (UNC). Accordingly, in the case where a block is erased, combination with erasing of the above-described address conversion information is preferable. In addition, any one of erasing of the address conversion information and erasing of the block may be first performed.

(Third Invalidation Method)

A third method of invalidating the user data D is similar to the second invalidation method except performing incomplete erasing. In the storage device 20A using the NAND memory 10, if the present method is used, it is possible to perform incomplete erasing by data invalidation at a high speed.

In general erasing of the NAND memory 10, complete erasing is performed until recording becomes possible. In the case of erasing the NAND memory 10, word lines WL0 to WLq for target blocks (the potential of the word lines are set to 0 V) are selected, the bit lines BL0 to BLp are set to a floating state, and a predetermined voltage is applied to a P-well of a Si substrate for a predetermined period of time, thereby extracting electrons from a floating gate. Thereafter, erasing state checking (Erase Verify) is performed and, if complete erasing is not performed, an erasing operation is repeated several times, thereby performing complete erasing.

For the purpose of disabling the user data D to be read, only one erasing operation is performed or the number of erasing operations is reduced so as to remove Erase Verify, thereby shortening the erasing time. In this case, the user data D is not completely erased, but the value of each cell is discretely changed. In effect, reading is hardly performed. Incomplete erasing described herein indicates that erasing is insufficient in view of re-recording and is sufficient in view of prevention of data reading.

In addition, the number of times of erasing is not limited to one and may be several times. Even in this case, it is possible to erase the user data D at a high speed as compared to complete block erasing. One erasing time (a time when an erasing voltage is applied) may be adjusted to a time which is enough for preventing the user data D from being read. By the erasing operation, the voltages of all cells are not uniformly decreased, but each memory cell is discretely decreased. Thus, even when a potential remains in the memory cell, it is very difficult to perform reproduction (restoring of read data user D) such as changing of a reading level (voltage applied to the word lines upon reading).

In addition, Erase Verify may be performed when invalidating the user data D. In this case, for example, the user data D is invalidated by the Erase Verify described in Japanese Patent Application Laid-Open (JP-A) No. 2003-249083.

In addition, if new user data D is recorded in the block erased by the third invalidation method, data corruption occurs. Thus, it is necessary to perform a general erasing operation before recording the new user data D. In an SSD which erases a free block just before recording and then uses the free block, incomplete erasing does not need to be recorded. If an SSD which performs erasing when a block becomes a free block, a block which is incompletely erased is recorded as internal management information of the storage device 20A and then completes erasing needs to be performed again.

(Fourth Invalidation Method)

As a fourth method of invalidating user data D, there is a method of simultaneously erasing a plurality of blocks in a chip in the second and third invalidation methods. In this method, for example, by the erasing method described in JP-A No. 8-306196, the plurality of blocks in the chip is simultaneously erased. By this method, it is possible to invalidate the user data D at a higher speed than the second and third invalidation methods.

(Fifth Invalidation Method)

In addition, as a fifth method of invalidating user data D, there is a method of erasing data in a NAND memory chip using one operation. In this method, all word lines of the chip are selected and a voltage is applied to a P-well, thereby erasing the entire chip. In addition, in this method, since power consumption may be increased, control such as erasing of the chip one by one is necessary when a plurality of chips is not collectively erased.

In addition, in the storage device 20A using the NAND memory 10, firmware which is a control program of a drive or management information such as the above-described address conversion information used by the control program is recorded in the NAND memory 10. Accordingly, if the present method is used, such data is all erased and the storage device is not operated after erasing. In other words, in this method, the storage device 20A becomes a failure state after erasing the user data D. Accordingly, it is possible to disable the user data D to be restored.

As data invalidation of the entire chip, in addition to erasing, a recording voltage may be applied in a direction in which the potentials of all memory cells are increased so as to overwrite data on the user data D. More specifically, all bit lines BL0 to BLp may be set to 0 and a program voltage may be applied to all word lines WL0 to WLq.

After erasing the user data D, error in which the boot program stored in the boot ROM 105 does not find firmware upon next start-up is detected. By indicating that firmware is not present through an interface or using a signal property of the LED for reporting the drive access state, it is possible to distinguish this from external other failure.

As the process of invalidating the user data D in the present embodiment, the methods other than the method of erasing all data in the above-described storage device 20A are preferable. That is, the first to fourth methods are preferable.

(Other Invalidation Method)

In addition to the above-described methods, there are various methods of invalidating the user data D. For example, there is a method of recording information indicating that the user data D is invalidated in the above-described system area 11a and, if the recorded information is present, disabling a response to a reading command from the host device. In this case, before a write command is received from the host device, it is necessary to initialize at least address conversion information. Alternatively, it is necessary to record a logical address in which an invalidation process is being performed. As another method, there is a method of actually overwriting meaningless data (for example, 0) on the user data D corresponding to the logical address.

As described above, since the process of invalidating the user data D may use various methods, the method used to perform the process of invalidating the user data D may be set by the host device 30A in advance.

That is, the method of invalidating the user data D is stored in the system area 11a of the storage device 20A in addition to a variety of information described in the above-described and below-described embodiments. In this case, since combination use may be possible according to the erasing method, the number of storage types may be two or more. The password authentication module 25 has a setting function for setting (storing) user data invalidation type information in the system area 11a when receiving a request for setting a user data invalidation type from the regular host device 30A, in addition to the above-described functions.

For example, the password authentication module 25 may perform setting of a single invalidation method, such as setting only the above-described first invalidation method (initialization of the address conversion information), setting of only the above-described second invalidation method (complete erasing of the block for holding the user data), and setting of only the above-described third invalidation method (incomplete erasing of the block for holding the user data). The password authentication module 25 may perform setting of a combination of the above-described first invalidation method (initialization of the address conversion information) and the above-described third invalidation method (incomplete erasing of the user data). In order to realize them, information indicating whether or not each of the methods of invalidating the user data is performed may be set (stored) or a number may be applied to each possible combination and stored. Alternatively, a level may be attached according to invalidation strength and the method may be set according to the level. The password authentication module 25 has a function for performing the process of invalidating the user data D based on the invalidation type information stored in the system area 11a when performing the process of invalidating the user data. By the above configuration, the user data D is invalidated using the user data invalidation type set from the host device 30A.

Figure 8:
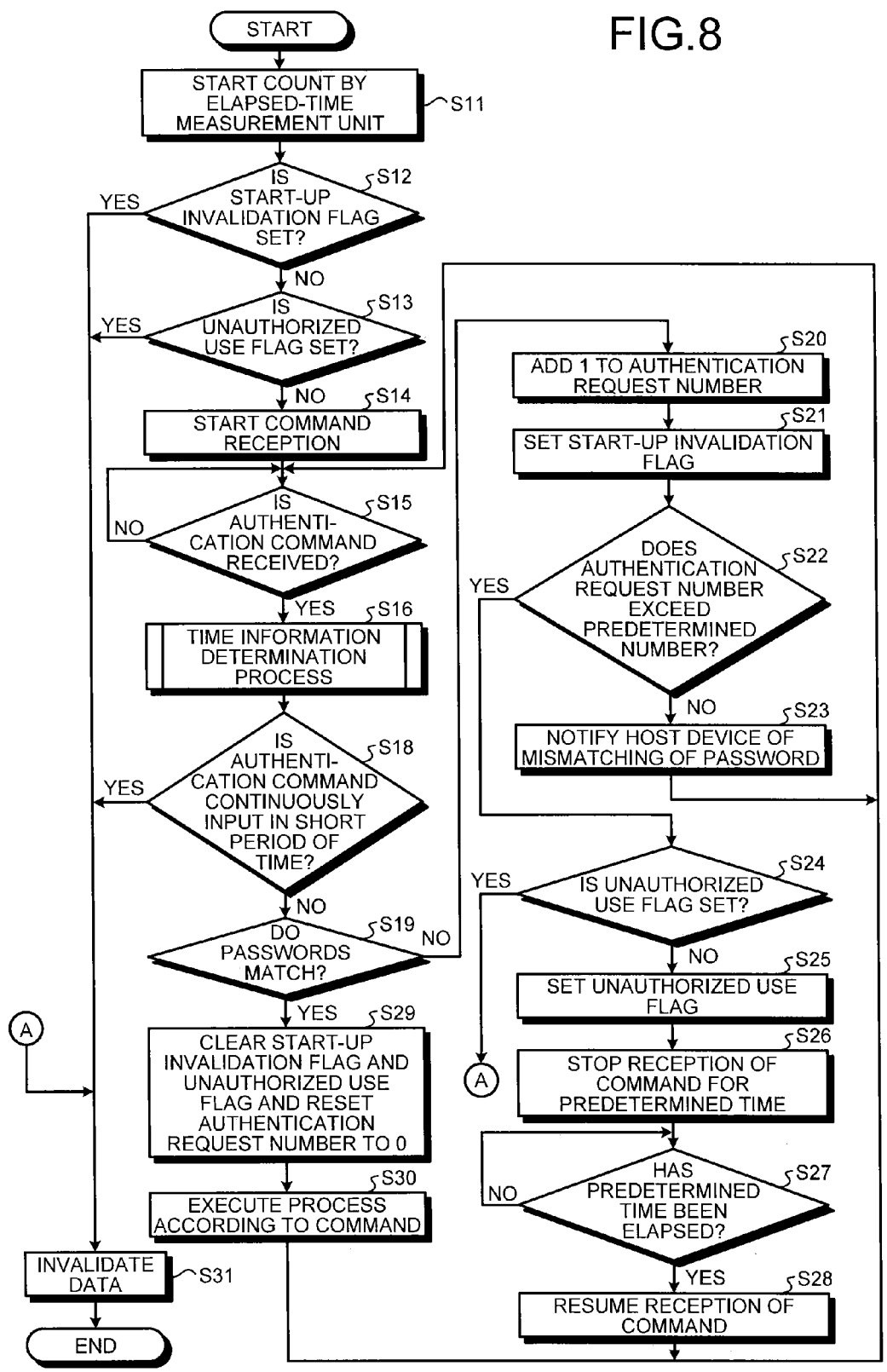
FIG. 8 is a flowchart illustrating the procedure of a command reception process executed by the storage device.

Next, the operation of the storage device 20A including the above-described configuration will be described with reference to FIGS. 8 to 11. FIG. 8 is a flowchart illustrating the procedure of a command reception process executed by the storage device. By manipulation of a power supply button (not illustrated), when the power of the host device 30A is turned on and power is supplied to the storage device 20A, the elapsed-time measurement unit 130 starts count (step S11).

Subsequently, the command reception unit 201 checks the start-up invalidation flag state held in the storage unit 206 and determines whether or not the start-up invalidation flag is set (step S12). Here, if it is determined that the start-up invalidation flag is set (Yes in step S12), the command reception unit 201 determines that a previous operation is suspected of an unauthorized operation. In this case, the data invalidation unit 205A invalidates the user data D (step S31) and the present process is finished.

In step S12, if it is determined that the start-up invalidation flag is not set (No in step S12), the command reception unit 201 determines whether or not the unauthorized use flag is set (step S13). Here, if it is determined that the unauthorized use flag is set (Yes in step S13), the command reception unit 201 determines that a previous operation is an authorized operation. In this case, the data invalidation unit 205A invalidates the user data D (step S31) and the present process is finished.

If it is determined that the start-up invalidation flag and the unauthorized use flag are not set (No in step S13), the command reception unit 201 starts the reception of the authentication command (step S14) and waits until the authentication command is received from the host device 30A (No in step S15). When the authentication command is received from the host device 30A (Yes in step S15), the time information determination unit 202 executes a time information determination process with respect to this authentication command (step S16). Now, the time information determination process of step S16 will be described with reference to FIG. 9.

Figure 9:
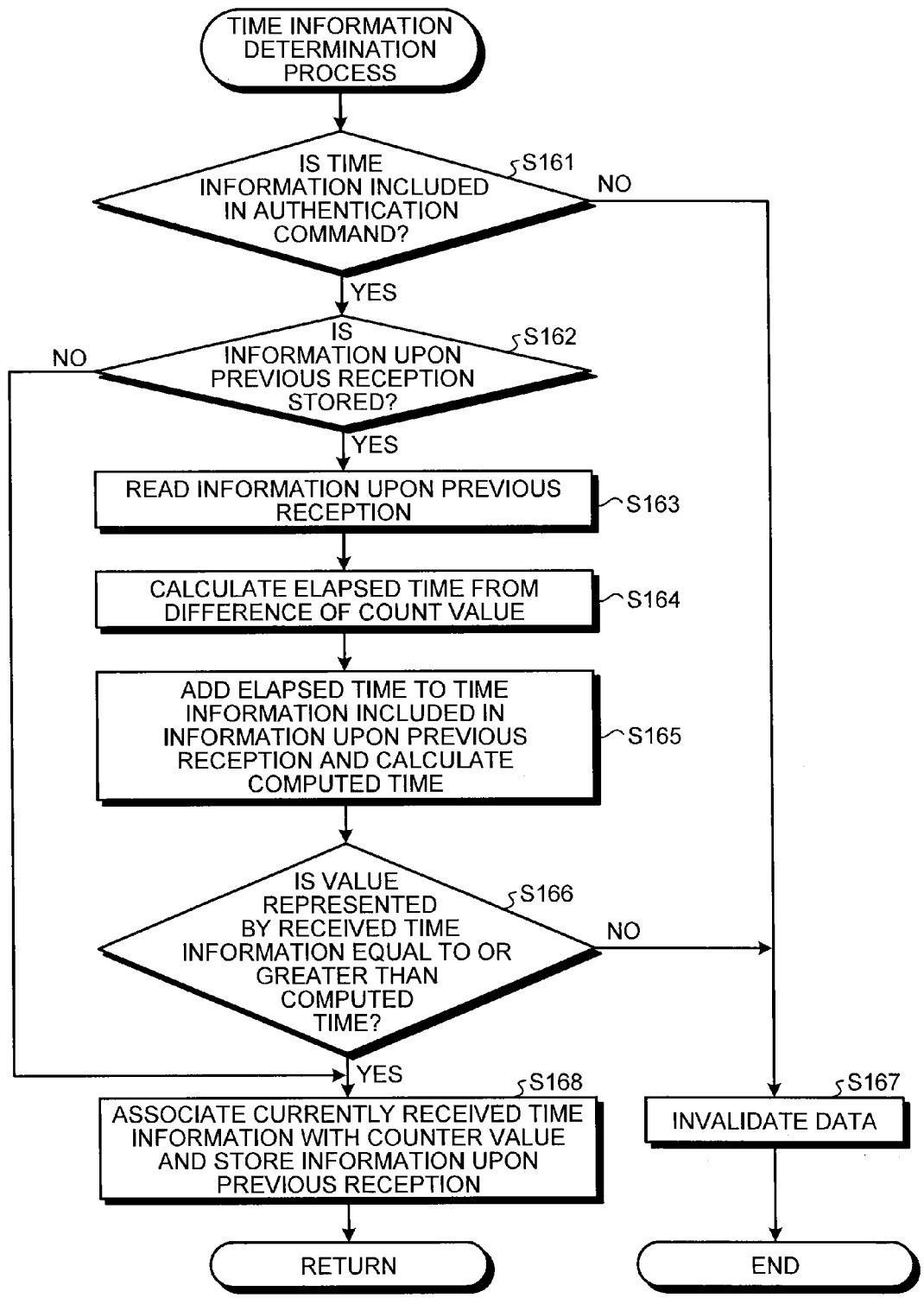
FIG. 9 is a flowchart illustrating the procedure of a time information determination process.

FIG. 9 is a flowchart illustrating the procedure of the time information determination process. First, the time information determination unit 202 determines whether or not time information is included in the authentication command (step S161). If it is determined that the time information is not included (No in step S161), the time information determination unit 202 determines that the received authentication command is an unauthorized command. In this case, the data invalidation unit 205A invalidates the user data D (step S167) and the present process is finished.

If the time information is included in the authentication command (Yes in step S161), the time information determination unit 202 determines whether or not information upon previous reception is stored in the storage unit 206 (step S162). If it is determined that the information upon previous reception is not stored in the storage unit 206 (No in step S162), the time information determination unit 202 transitions to the process of step S168.

In contrast, if it is determined that the information upon previous reception is stored (Yes in step S162), the time information determination unit 202 reads the information upon previous reception from the storage unit 206 (step S163). Next, the time information determination unit 202 calculates an elapsed time from a time when receiving a previous authentication command to a time when receiving a current authentication command, from a difference between the counter value included in the information upon previous reception and the current counter value of the elapsed-time measurement unit 130 (step S164).

Subsequently, the time information determination unit 202 adds the elapsed time calculated in step S164 to the time information included in the information upon previous reception and derives a computed time (step S165). Then, the time information determination unit 202 compares the computed time and the time information included in the input authentication command and determines whether a value representing the time information (seconds) is equal to or greater than a value (seconds) representing the computed time (step S166).

Now, the operations of steps S164 to S166 will be described with reference to FIG. 10. FIG. 10 is a diagram illustrating the time information determination process. First, in the host device 30A, if an authentication command (hereinafter, referred to as a first authentication command) is received at 13:14:15, Nov. 12, 2010, the storage device 20A receives the first authentication command. In FIG. 10, a password included in the first authentication command is "ABCDEFGH" and time information is "D08A5F27". In the storage device 20A, when the counter value of the elapsed-time measurement unit 130 is 100 (seconds), since the first authentication command is received, the set of the time information "D08A5F27" and the counter value "100" is stored as information upon previous reception in the above-described process of step S168.

Thereafter, when an authentication command (hereinafter, referred to as a second authentication command) is transmitted from the host device 30A at 13:24:15, Nov. 12, 2010, the storage device 20A receives the second authentication command. In FIG. 10, a password included in the second authentication command is "ABCDEFGH" as the previous authentication command and time information is "D08A617F". In the storage device 20A, when the counter value of the elapsed-time measurement unit 130 is 700 (seconds), the second authentication command is received.

The time information determination unit 202 sets a difference "600" between the counter value "100" when the first authentication command is received and the counter value "700" when the second authentication command is received as the elapsed time from a time when the first authentication command is received to a time when the second authentication command is received, in the case where a request command is the condition illustrated in FIG. 9. The time information determination unit 202 adds the elapsed time "600" to the time information "D08A5F27" included in the first authentication command and derives the computed time "D08A617F". Then, the time information determination unit 202 compares the computed time "D08A617F" and the time information "D08A617F" included in the second authentication command and determines a temporal relation.

Returning to FIG. 9, if the value (seconds) represented by the time information is less than the value (seconds) represented by the computed time as the result of comparison of step S166 (No in step S166), mismatching occurs in the temporal relation between the computed time and the time information and thus the time information determination unit 202 determines unauthorization (mismatching). In this case, the data invalidation unit 205A invalidates the user data D (step S167) and the present process is finished.

If the time information is equal to or greater than the computed time (Yes in step S166), since mismatching does not occur in the temporal relation between the computed time and the time information, the time information determination unit 202 determines authorization (matching). The time information determination unit 202 associates the time information included in a currently received authentication command with the counter value of the elapsed-time measurement unit 130 when this authentication command is received and stores information upon previous reception in the storage unit 206 (step S168) and the process transitions to step S18 of FIG. 8.

In step S166, the reason why the case where the time information exceeds the computed time is authorized is as follows. When the power of the storage device 20A is disconnected after storing the information upon previous reception, the counter value of the elapsed-time measurement unit 130 starts counting from zero. In this case, the value (seconds) represented by the time information exceeds the value (seconds) represented by the computed time, but it is a proper operation. Thus, in this case, the use of the storage device 20A is not limited. However, since the time information less than the computed time is not generated in a general use environment, it is unauthorized. Thus, in this case, the use of the storage device 20A is limited.

Returning to FIG. 8, the password authentication unit 204 determines whether the authentication command received in step S15 is continuously input in a short period of time (step S18). For example, if the storage device 20A is exposed to brute force attack, a combination of a vast character string is input at a high speed as a password. Here, in step S18, in order to prevent such an unauthorized operation, it is detected that the authentication command is continuously input in a short period of time. In other words, in order to prevent an unauthorized operation, it is detected that the authentication command is input predetermined times or more in a predetermined period of time.

In step S18, if it is determined that the authentication command is continuously input in the short period of time (Yes in step S18), the password authentication unit 204 determines that an unauthorized operation is performed. In this case, the data invalidation unit 205A invalidates the user data D (step S31) and the present process is finished.

In step S18, if it is determined that the authentication command is not continuously input in the short period of time (No in step S18), the password authentication unit 204 compares the password included in the received authentication command and the checking password stored in the storage unit 206 and determines whether or not both passwords match (step S19).

If the passwords mismatch (No in step S19), the password authentication unit 204 adds 1 to an authentication request number (step S20). The authentication request number is a variable for recording the number of password authentication failure and is held in buffer memory, the storage unit 206, or the like.

Next, the password authentication unit 204 determines that there is a possibility of an unauthorized operation and sets the start-up invalidation flag (step S21). Subsequently, the password authentication unit 204 determines whether or not the authentication request number exceeds a predetermined number (hereinafter, referred to as an authentication limit number) and notifies the host device 30A of mismatching of the password (step S23) when the authentication request number is equal to or less than the authentication limit number (No in step S22) and the process returns to step S15.

In step S22, if it is determined that the authentication request number exceeds the authentication limit number (Yes in step S22), the password authentication unit 204 determines whether or not the unauthorized use flag is set (step S24). If the unauthorized use flag is set (Yes in step S24), the data invalidation unit 205A determines that the unauthorized operation is performed. In this case, the data invalidation unit 205A invalidates the user data D (step S31) and the present process is finished.

In step S24, if it is determined that the unauthorized use flag is not set (No in step S24), the password authentication unit 204 sets the unauthorized use flag (step S25). The command reception unit 201 stops the reception of the command from the host device 30A during a predetermined period of time according to the set unauthorized use flag of step S25 (step S26).

The process of step S26 is not performed for the purpose of password attack, but is performed for the purpose of temporarily protecting data on the NAND memory 10 intentionally if a mismatched password is input several times due to cracking (data on the NAND memory 10 is intentionally lost). In addition, during a command reception stop period, since there is no command response from the storage device 20A, the host device 30A may detect that abnormality occurs in the storage device 20A. Accordingly, by mounting a structure for automatically notifying a manager of the abnormality of the storage device 20A using such as a mail when abnormality occurs in the storage device 20A on the host device 30A, it is possible to rapidly cope with the abnormality of the storage device 20A.

The command reception unit 201 waits until a predetermined time has been elapsed (No in step S27), resumes the reception of the command (step S28) if the predetermined time has elapsed (Yes in step S27), and the process returns to step S15.

In contrast, in step S19, if matching of the password is checked (Yes in step S19), the password authentication unit 204 clears the start-up invalidation flag and the unauthorized use flag and resets the authentication request number to zero (step S29). An MPU (not illustrated) in the storage device 20A executes a process (for example, data read or write) according to the input command (step S30) and the process returns to step S15.

As described above, according to the first embodiment, when the command is input from the host device 30A, the storage device 20A determines matching of the time information based on the time information included in the authentication command and the count value of the elapsed-time measurement unit 130 and performs password authentication when matching is confirmed. Accordingly, it is possible to confirm authorization of the host device 30A which is an access source. In addition, when access from an unauthorized host device is performed, the data of the storage device 20A is invalidated. Thus, it is possible to simply improve security of the storage device 20A.

(Second Embodiment)

Next, a second embodiment of the present invention will be described using FIGS. 11 to 15. In the second embodiment, the user data D is encrypted and stored in the NAND memory 10 and an encryption key used for the encrypting is invalidated when password authentication fails or an authentication command is continuously input in a short period of time.

Figure 11:
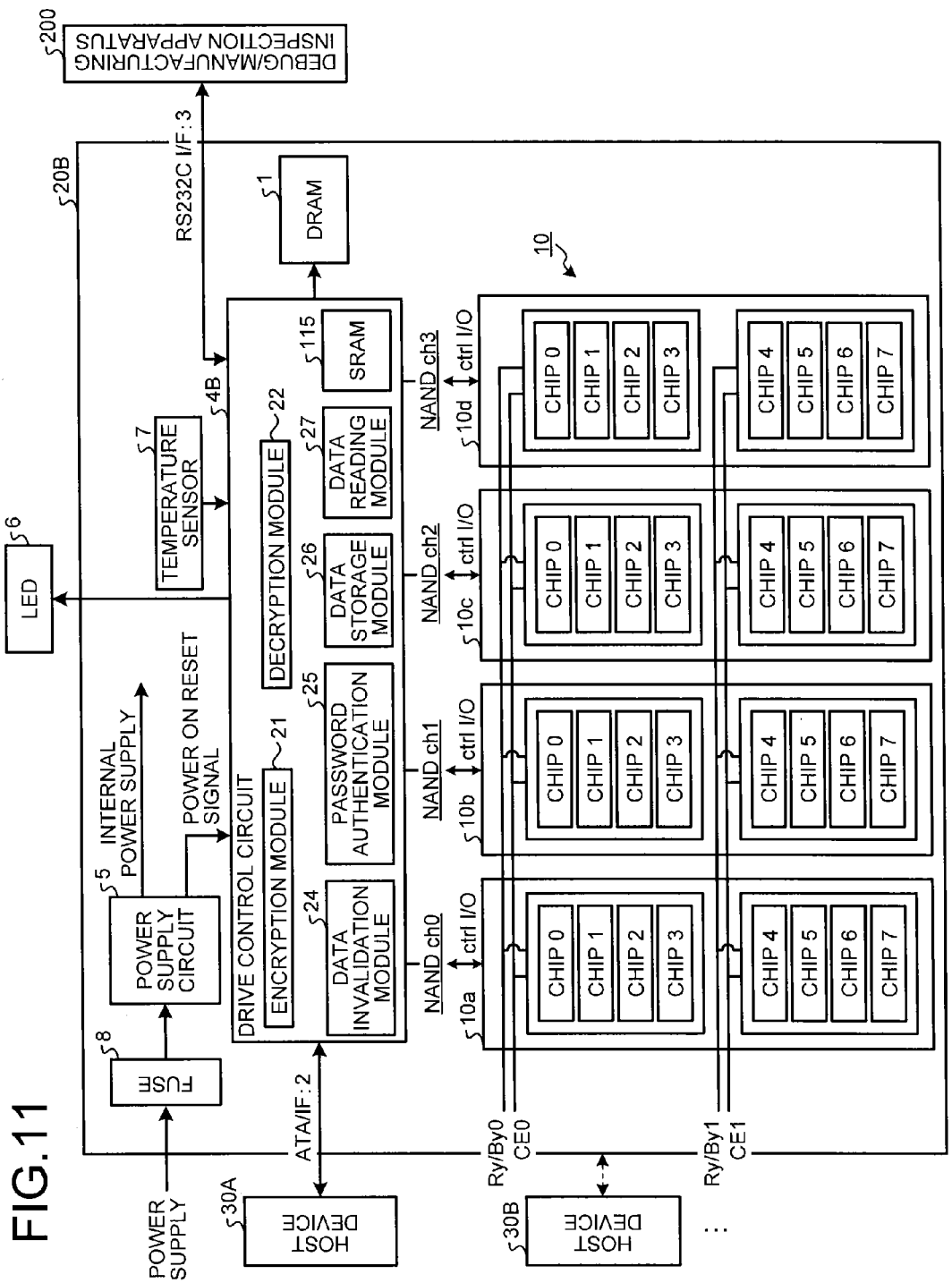
FIG. 11 is a block diagram illustrating an example of the configuration of a storage device according to a second embodiment.

FIG. 11 is a block diagram illustrating an example of the configuration of a data storage system according to the second embodiment. The components having the same function as the data storage system of the first embodiment illustrated in FIG. 2 among the components of FIG. 11 are denoted by the same reference numerals and thus are not repeatedly described.

The data storage system of the present embodiment includes a storage device 20B instead of the storage device 20A. The storage device 20B includes a drive control circuit 4B instead of the drive control circuit 4A. The drive control circuit 4B has a function for encrypting the user data D and a function for decrypting the user data D, in addition to the functions of the drive control circuit 4A. More specifically, the drive control circuit 4B includes an encryption module 21 and a decrypting module 22 in addition to the data invalidation module 24, the password authentication module 25, the data storage module 26, the data reading module 27, and the SRAM 115.

The encryption module 21 has an encryption function for encrypting and converting the user data D in a write request into encrypted data E based on an encryption key in static RAM (not illustrated) included in the storage device 20B according to a write request including the current user data D received from the host device 30A (or 30B, . . . ), when the data storage module 26 writes data if user authentication succeeds.

The decrypting module 22 has a decrypting function for decrypting the encrypted data E in the user area 11b based on the encryption key in the static RAM, based on a current read request received from the host device 30A (or 30B, . . . ), when the data reading module 27 writes data if user authentication succeeds.

For example, the storage device 20B has an SED function and stores data in a state of being encrypted by a predetermined encryption type such as an Advanced Encryption Standard (AES). The storage device 20B determines whether or not access from the host device is authorized based on the predetermined password and time information and allows data to be written or read in or from a recording medium only when it is determined that access is authorized. Thus, upon access to the storage device 20B, the CPU 11 transmits an authentication command including a password for predetermined decryption and time information acquired from the clock unit 14 to the storage device 20B along with a command instructing read/write, etc.

In the present embodiment, before the data storage module 26 writes data in the NAND memory 10, the encryption module 21 converts the data into the encrypted data E. In the present embodiment, the data reading module 27 reads the encrypted user data D (encrypted data E) and the decrypting module 22 converts the encrypted user data D into user data D of plain text and outputs the user data D to the host device 30A.

Figure 12:
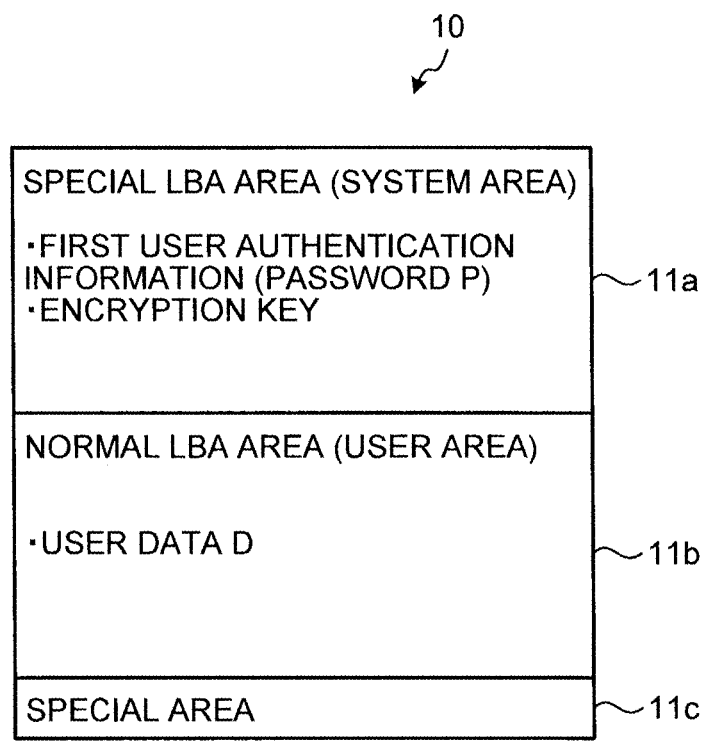
FIG. 12 is a schematic diagram illustrating data in NAND memory according to the second embodiment.

FIG. 12 is a schematic diagram illustrating data in the NAND memory according to the second embodiment. The NAND memory 10 of the present embodiment stores the encryption key in the system area 11a along with first user authentication information in advance.

Here, the encryption key is key data configuring a part of the encryption key written in the static RAM (volatile memory). The user area 11b of the present embodiment stores the encrypted data E which is the user data D encrypted by the encryption module 21 based on the encryption key.

Figure 13:
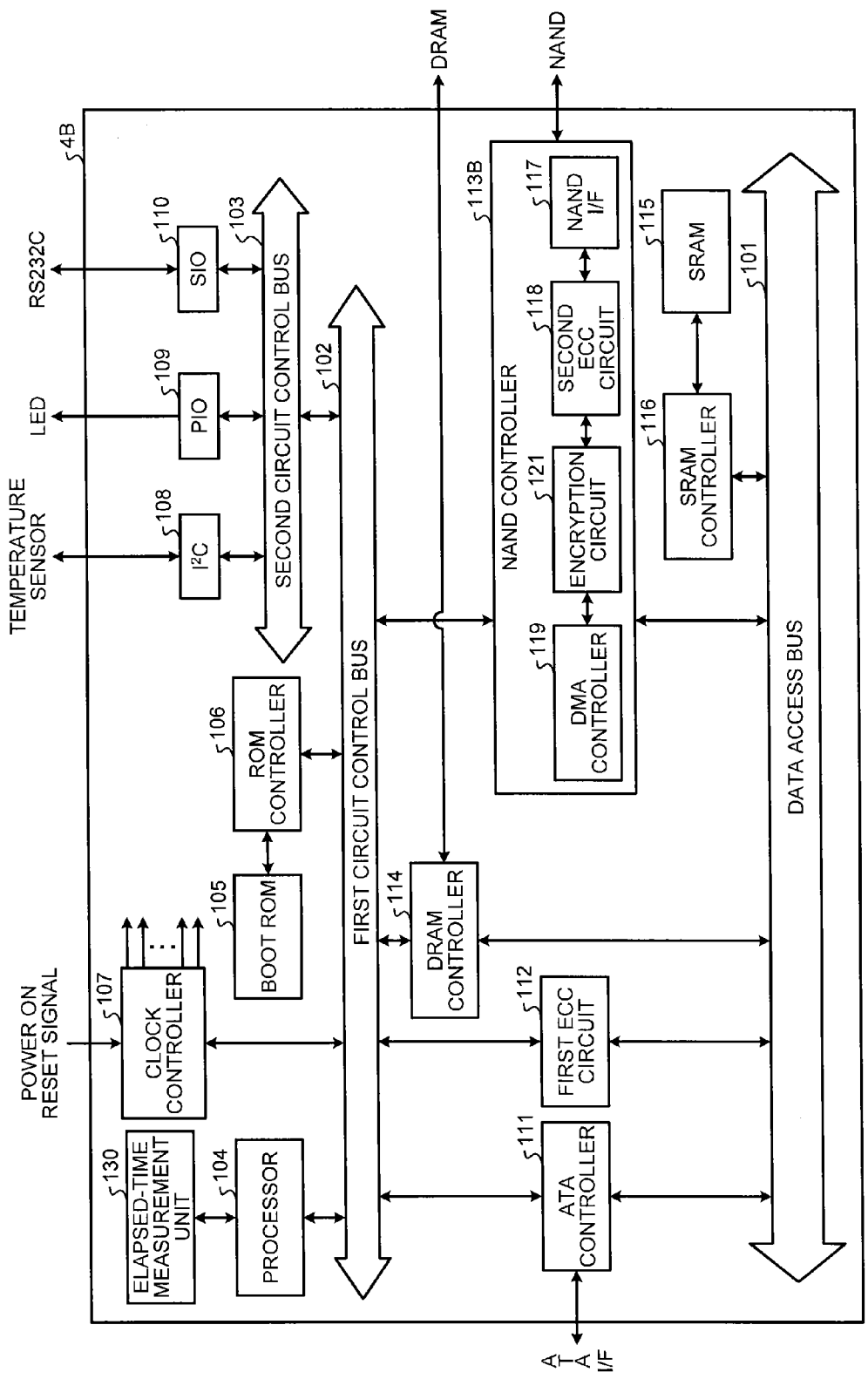
FIG. 13 is a block diagram illustrating a hardware internal configuration example of a drive control circuit according to the second embodiment.

FIG. 13 is a block diagram illustrating a hardware internal configuration example of a drive control circuit according to the second embodiment. The components having the same function as the drive control circuit 4A of the first embodiment illustrated in FIG. 6 among the components of FIG. 13 are denoted by the same reference numerals and thus are not repeatedly described.

The drive control circuit 4B of the present embodiment includes a NAND controller 113B instead of the NAND controller 113A. The NAND controller 113B includes an encryption circuit 121 instead of the randomization circuit 122 included in the NAND controller 113A.

The encryption circuit 121 encrypts the data stored in the NAND memory 10. Since the encrypted data may be regarded as a random number, it is possible to increase the lifespan of the NAND memory, similarly to the randomization circuit 122.

The encryption circuit 121 is, for example, provided between the DMA controller 119 and the second ECC circuit 118. In addition, the encryption circuit 121 may be provided between the second ECC circuit 118 and the NAND I/F 117. FIG. 13 illustrates the case where the encryption circuit 121 is connected to the DMA controller 119 and the second ECC circuit 118 is connected to the encryption circuit 121.

Figure 14:
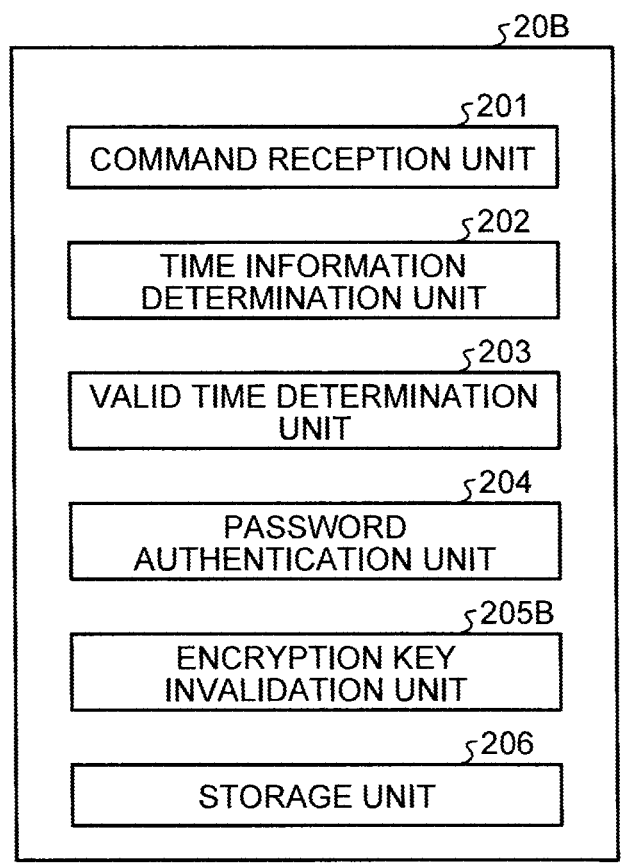
FIG. 14 is a diagram illustrating a functional configuration of the storage device according to the second embodiment.

FIG. 14 is a diagram illustrating a functional configuration of the storage device according to the second embodiment. As illustrated in FIG. 14, the storage device 20B includes an encryption key invalidation unit 205B instead of the data invalidation unit 205A included in the storage device 20A. More specifically, the storage device 20B includes a command reception unit 201, a time information determination unit 202, a valid time determination unit 203, a password authentication unit 204, an encryption key invalidation unit 205B, and a storage unit 206.

The valid time determination unit 203 of the present embodiment executes a valid time determination process of determining whether or not the encryption key stored in the storage unit 206 is within an encryption key valid time range based on an encryption key valid time when the encryption key is valid. In addition, details of the valid time determination process will be described below (see FIG. 15).

The encryption key invalidation unit 205B is a functional unit for invalidating the encryption key according to the determined (judged) results of the time information determination unit 202, the valid time determination unit 203, and the password authentication unit 204. Here, the invalidation of the encryption key indicates that encryption/decryption of the data using the encryption key is disabled. In other words, an object is to prevent the data recorded in the NAND memory 10 from being read and prevent data from being written in the NAND memory 10.

As a detailed invalidation method, there is a method of erasing the encryption key, a method of further encrypting the encryption key so as to replace a character string (data) configuring the encryption key with another character string, or the like. If the latter method is used, a structure for restoring (decrypting) the replaced encryption key may be mounted in the storage device 20B.

More specifically, the storage unit 206 stores a checking password, an encryption key, a password setting date and time, an encryption key valid time, the above-described start-up invalidation flag, the unauthorized use flag, and etc. as information associated with the execution of the command reception process.

The encryption key is generated by the encryption key invalidation unit 205B and is used to encrypt/decrypt data. In addition, the encryption key is generated when the checking password is set. The method of generating the encryption key is not specially limited and, for example, the checking password may be used as a generation seed. The encryption key valid time is information indicating the valid time (second unit) of the encryption key and is based on the password setting date and time (encryption key generation date and time).

Next, the operation of the storage device 20B having the above-described configuration will be described. In addition, the same operations as the storage device 20A described with reference to FIG. 8 will not be described. The storage device 20B of the present embodiment invalidates the encryption key instead of data invalidation. More specifically, if it is determined that the start-up invalidation flag is set (Yes in step S12), the encryption key invalidation unit 205B invalidates the encryption key. If it is determined that the unauthorized use flag is set (Yes in step S13), the encryption key invalidation unit 205B invalidates the encryption key. If the authentication command is continuously input in a short period of time (Yes in step S18), the encryption key invalidation unit 205B invalidates the encryption key. If the unauthorized use flag is set (Yes in step S24), the encryption key invalidation unit 205B invalidates the encryption key.

Figure 15:
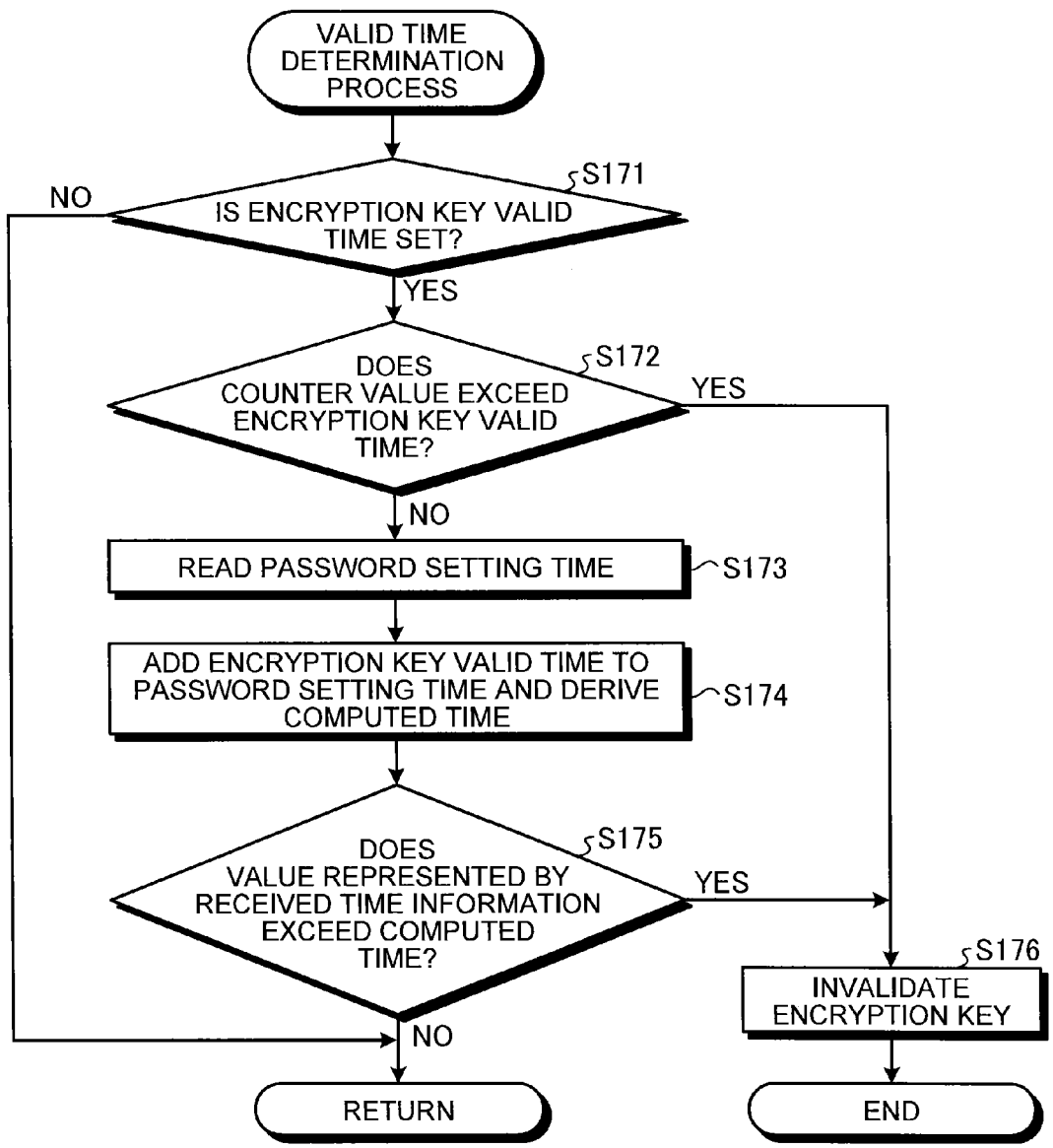
FIG. 15 is a flowchart illustrating the procedure of a valid time determination process.

In the present embodiment, after the time information determination process of step S16, the valid time determination unit 203 executes the valid time determination process. Hereinafter, the valid time determination process will be described with reference to FIG. 15. Here, FIG. 15 is a flowchart illustrating the procedure of the valid time determination process.

First, the valid time determination unit 203 determines whether or not the encryption key valid time is set in the storage unit 206 (step S171). If the encryption key valid time is not set (No in step S171), the process transitions to step S18 of FIG. 4. If it is determined that the encryption key valid time is set (Yes in step S171), the valid time determination unit 203 determines whether or not the current counter value of the elapsed-time measurement unit 30 exceeds the encryption key valid time (step S172).

In step S172, if the current counter value exceeds the encryption key valid time (Yes in step S172), the valid time determination unit 203 determines that the encryption key has been expired. In this case, the encryption key invalidation unit 205B invalidates the encryption key (step S176) and the present process is finished.

In step S172, if it is determined that the counter value of the elapsed-time measurement unit 30 is equal to or less than the encryption key valid time (No in step S172), the encryption key invalidation unit 205B transitions to the process of step S173. In addition, the determination process of step S172 is to cope with the case where a time has been elapsed in a state in which password authentication is not performed once after power is supplied to the host device 30A.

Subsequently, the valid time determination unit 203 reads the password setting date and time from the storage unit 206 (step S173) and adds the encryption key valid time to the password setting date and time so as to derive a computed time (step S174). Then, the valid time determination unit 203 compares the computed time derived in step S174 and the time information included in the currently received authentication command and determines whether or not the value (seconds) represented by the time information exceeds the value (seconds) represented by the computed time (step S175).

In step S175, if it is determined that the time information exceeds the computed time (Yes in step S175), the valid time determination unit 203 determines that the encryption key has been expired. In this case, the encryption key invalidation unit 205B invalidates the encryption key (step S176) and the present process is finished. In contrast, in step S175, if it is determined that the time information is equal to or less than the computed time (No in step S175), the process transitions to step S18 of FIG. 11.

As described above, according to the second embodiment, when access is performed from an unauthorized host device, since the encryption key in the storage device 20B is invalidated, it is possible to simply improve security of the storage device 20B.

According to the first and second embodiments, when access is performed from an unauthorized host device, since the user data D or the encryption key in the non-volatile semiconductor memory is invalidated, it is possible to simply improve security of the storage devices 20A and 20B.

Although several embodiments of the present invention are described, such embodiments are only exemplary and is not intended to limit the range of the invention. For example, in the second embodiment, for the invalidation process, the data invalidation unit 205A of the first embodiment may be included along with the encryption key invalidation unit 205B. In addition, the encryption key invalidation type may be added to one pieces of set invalidation type information.

Even the process (step S171 to step S176) associated with the encryption key valid time of the second embodiment is applicable to the case where the encryption circuit 121 is not present, such as the first embodiment, if the encryption key is replaced with data, the encryption key valid time is replaced with a data valid time, the encryption key invalidation is replaced with data invalidation, and the data valid time is information indicating the valid time (second unit) of data and is based on the password setting date and time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, although two flags including the start-up invalidation flag and the unauthorized use flag are used, only the unauthorized use flag may be used. In the above embodiments, although the user data D or the encryption key is invalidated if the start-up invalidation flag is set when power is supplied to the storage device 20A or 20B (upon start-up), the present invention is not limited thereto and the user data D or the encryption key may be invalidated only when the unauthorized use flag is set.

What is claimed is:

1. A storage device comprising:

a storage unit that stores data in a storage area;

a reception unit that receives an input of a command, the command including time information representing a current date and time;

a calculator that calculates an elapsed time from input of a previous command to input of a current command based on the time information included in the currently input command and on a counter value counted until the corresponding command is input;

an adder that adds the elapsed time calculated by the calculator to the time information included in the previously input command;

a time information determination unit that determines matching of the time information based on a temporal relation between the adding result of the adder and the time information included in the currently input command; and an authentication unit that performs authentication of the currently input command.

2. The storage device according to claim 1, further comprising:

an invalidation unit that invalidates the data stored in the storage area when mismatching is determined by the time information determination unit, wherein a logical address representing a logical storage location in the storage area is specified by the host device when storing the data in the storage area, the storage unit converts the logical address into a physical address based on address conversion information representing correspondence between the logical address and the physical address that is an address in the storage area, the storage unit storing the data at the location of the converted physical address, and the invalidation unit invalidates the data stored in the storage area by changing the address conversion information so as to eliminate the physical address corresponding to the logical address.

3. The storage device according to claim 1, further comprising an invalidation unit that invalidates the data stored in the storage area when mismatching is determined by the time information determination unit, wherein the invalidation unit erases data, that is present in a block including data written from the host device, from the storage area.

4. The storage device according to claim 3, wherein the storage unit is a NAND type flash memory, the NAND type flash memory performs a determination process of determining whether or not erasing is completed after a process directed to erasing the stored data is performed and, when erasing is determined to be incomplete, the NAND type flash memory repeats the process directed to erasing the stored data until the erasing is determined to be complete, and the invalidation unit performs erasing without performing the determination process of determining whether or not the erasing is completed when erasing data in a block, the block including the data written from the host device.

5. The storage device according to claim 2,
wherein the storage unit is a NAND type flash memory,
the storage unit stores a control program and the address conversion information, the control program being a program for controlling an operation of the storage unit, and
the invalidation unit invalidates the data stored in the storage area by erasing data in an entire chip of the NAND type flash memory constituting the storage unit.

6. The storage device according to claim 2,
wherein the storage unit is a NAND type flash memory,
the storage unit stores a control program and the address conversion information, the control program being a program for controlling an operation of the storage unit, and
the invalidation unit invalidates the data stored in the storage area by overwriting data in an entire chip of the NAND type flash memory configuring the storage unit.

7. The storage device according to claim 1, wherein the time information determination unit determines matching when a date and time represented by time information included in the currently input command is equal to or greater than a date and time represented by the elapsed time calculated by the calculator.

8. The storage device according to claim 1, further comprising:
an invalidation unit that invalidates the data stored in the storage area when mismatching is determined by the time information determination unit; and
a determination unit that detects a number of times of input of the command per given time and that determines whether or not the number of times of input exceeds a predetermined upper limit value,
wherein, if the determination unit determines that the number of times of input exceeds the predetermined upper limit value, the invalidation unit invalidates the data stored in the storage area.

9. The storage device according to claim 1, wherein the reception unit stops reception of the command for a predetermined period of time if authentication of a password by the authentication unit fails a predetermined number of times.

10. The storage device according to claim 1, further comprising:
an invalidation unit that invalidates the data stored in the storage area when mismatching is determined by the time information determination unit, and
a valid time determination unit that compares an encryption key valid time indicating a valid time of the encryption key with the counter value and that determines that the encryption key has been expired when the counter value exceeds the encryption key valid time,
wherein the storage unit stores encrypted data obtained by encrypting the data based on the encryption key and decrypts the encrypted data based on the encryption key, and
the invalidation unit invalidates the data stored in the storage area by invalidating the encryption key if the valid time determination unit determines that the counter value is outside a range of the encryption key valid time.

11. The storage device according to claim 10, wherein the valid time determination unit adds the encryption key valid time to a password setting date and time representing a date and time when the password is set and determines that the encryption key has been expired when the date and time represented by the adding result exceeds the date and time represented by the time information included in the command.

12. The storage device according to claim 1, further comprising an invalidation unit that invalidates the data stored in the storage area when mismatching is determined by the time information determination unit,
wherein the invalidation unit invalidates the data stored in the storage area by erasing the encryption key or replacing the encryption key with another character string.

13. A protection method comprising:
starting counting an elapsed time in response to supply of power to a storage unit that stores data in a storage area;
receiving an input of a command that includes time information, the time information representing a current date and time;
calculating an elapsed time from input of a previous command to input of a current command based on the time information included in the currently input command and on a counter value counted until the corresponding command is input;
adding the calculated elapsed time to the time information included in the previously input command;
determining matching of the time information based on a temporal relation between the adding result and the time information included in the currently input command; and
performing authentication of the currently input command.

14. The protection method according to claim 13, further comprising:
specifying a logical address representing a logical storage location in the storage area by a host device so as to store the data in the storage area;
converting the logical address into a physical address based on address conversion information representing correspondence between the logical address and the physical address that is an address in the storage area and storing the data at the location of the converted physical address, by the storage unit;
invalidating the data stored in the storage area when the time information is a mismatch; and
invalidating the data stored in the storage area by changing the address conversion information so as to eliminate the physical address that corresponds to the logical address.

15. The protection method according to claim 13, further comprising:
invalidating the data stored in the storage area when the time information is a mismatch,
wherein, in the invalidating of the data stored in the storage area, data in a block that includes data written from the host device is erased from the storage area.

16. The protection method according to claim 5,
wherein the storage unit is a NAND type flash memory,
the NAND type flash memory performs a determination process of determining whether or not erasing is completed after a process directed to erasing the stored data is performed and, when erasing is determined to be incomplete, the NAND type flash memory repeats the process directed to erasing the stored data until the erasing is determined to be complete, and,
in the invalidating of the data stored in the storage area, erasing is performed without performing the determination process of determining whether or not the erasing is completed when erasing data in a block, the block including the data written from the host device.

17. The protection method according to claim 14,
wherein the storage unit is a NAND type flash memory,
the storage unit stores a control program and the address conversion information, the control program being a program for controlling an operation of the storage unit, invalidating the data stored in the storage area when the time information is a mismatch, and in the invalidating of the data stored in the storage area, the data stored in the storage area is invalidated by erasing data in an entire chip of the NAND type flash memory configuring the storage unit.

18. The protection method according to claim 14, wherein the storage unit is a NAND type flash memory, the storage unit stores a control program and the address conversion information, the control program being a program for controlling an operation of the storage unit, invalidating the data stored in the storage area when the time information is a mismatch, and in the invalidating of the data stored in the storage area, the data stored in the storage area is invalidated by overwriting data in an entire chip of the NAND type flash memory configuring the storage unit.

19. The protection method according to claim 13, wherein, in the determining of matching of the time information, matching is determined when a date and time represented by time information included in the currently input command is equal to or greater than a date and time represented by the calculated elapsed time.

20. An electronic apparatus comprising:
a storage unit that stores data in a storage area;
a clock unit that generates time information representing a current date and time;
a transmission unit that, upon access to the storage unit, transmits a command to the storage unit, the command including the time information;
a reception unit that receives an input of the command from the transmission unit;
a calculator that calculates an elapsed time from input of a previous command to input of a current command based on the time information included in the currently input command and on a counter value counted until the corresponding command is input;
an adder that adds the elapsed time calculated by the calculator to the time information included in the previously input command;
a time information determination unit that determines matching of the time information based on a temporal relation between the adding result of the adder and the time information included in the currently input command; and
an authentication unit that performs authentication of the currently input command.

21. A storage device comprising:
a storage;
a referring unit that refers to matching between first time information and second time information based on the first time information, the second time information, and elapsed time, the first time information being included in a first command, the second time information being included in a second command, the elapsed time being measured from when the first command is input to when the second command is input; and
an authentication unit that performs authentication of the second command.

* * * * *